United States Patent
Kim et al.

(10) Patent No.: US 12,096,508 B2
(45) Date of Patent: Sep. 17, 2024

(54) METHOD FOR TRANSMITTING UPLINK THROUGH PRECONFIGURED UPLINK RESOURCE IN WIRELESS COMMUNICATION SYSTEM, AND DEVICE THEREFOR

(71) Applicant: LG ELECTRONICS INC., Seoul (KR)

(72) Inventors: Jaehyung Kim, Seoul (KR); Changhwan Park, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 392 days.

(21) Appl. No.: 17/594,941

(22) PCT Filed: May 4, 2020

(86) PCT No.: PCT/KR2020/005907
§ 371 (c)(1),
(2) Date: Nov. 3, 2021

(87) PCT Pub. No.: WO2020/226400
PCT Pub. Date: Nov. 12, 2020

(65) Prior Publication Data
US 2022/0240341 A1    Jul. 28, 2022

(30) Foreign Application Priority Data

May 3, 2019 (KR) .................. 10-2019-0052604
May 10, 2019 (KR) .................. 10-2019-0055268

(51) Int. Cl.
*H04W 76/27* (2018.01)
*H04L 5/00* (2006.01)

(52) U.S. Cl.
CPC .......... *H04W 76/27* (2018.02); *H04L 5/0051* (2013.01); *H04L 5/0064* (2013.01)

(58) Field of Classification Search
None
See application file for complete search history.

(56) References Cited

U.S. PATENT DOCUMENTS 11,844,135 B2 * 12/2023 Sha ...................... H04W 76/27
2018/0368046 A1    12/2018 Zhang et al.
(Continued)

OTHER PUBLICATIONS

PCT International Application No. PCT/KR2020/005907, International Search Report dated Aug. 24, 2020, 5 pages.
(Continued)

*Primary Examiner* — Otis L Thompson, Jr.
(74) *Attorney, Agent, or Firm* — LEE, HONG, DEGERMAN, KANG & WAIMEY

(57) ABSTRACT

According to the present specification, a method for transmitting an uplink signal through a PUR in a wireless communication system comprises: receiving, and in a radio resource control (RRC) connected state, PUR configuration information for uplink signal transmission based on the PUR; transitioning from the RRC connected state to an RRC idle state; receiving, on a first resource of the PUR, a first (DCI) including first PUR update information for updating PUR configuration; and transmitting a first uplink signal on a second resource of the PUR on the basis of whether or not the first DCI has been received, wherein when the terminal successfully receives the first DCI, the first uplink signal is transmitted after the PUR configuration based on the first PUR update information is applied thereto irrespective of the presence or absence of data for uplink transmission on the second resource.

17 Claims, 23 Drawing Sheets

(56) References Cited

U.S. PATENT DOCUMENTS

| | | | |
|---|---|---|---|
| 2020/0107389 A1* | 4/2020 | Charbit | H04W 76/27 |
| 2020/0107396 A1* | 4/2020 | Wang | H04W 72/23 |
| 2020/0137761 A1* | 4/2020 | Shih | H04W 76/27 |
| 2020/0196264 A1* | 6/2020 | Shih | H04W 74/0833 |
| 2020/0245334 A1* | 7/2020 | Phuyal | H04L 1/1825 |
| 2020/0350949 A1* | 11/2020 | Rico Alvarino | H04L 1/1854 |
| 2020/0351023 A1* | 11/2020 | Rico Alvarino | H04W 8/24 |
| 2020/0351844 A1* | 11/2020 | Rico Alvarino | H04B 1/7143 |
| 2021/0112559 A1* | 4/2021 | Ou | H04W 56/0045 |
| 2021/0212149 A1* | 7/2021 | Shih | H04W 74/006 |
| 2021/0218495 A1* | 7/2021 | Bi | H04L 1/1864 |
| 2021/0345344 A1* | 11/2021 | Sha | H04W 24/08 |
| 2021/0385834 A1* | 12/2021 | Morozov | H04W 52/0216 |
| 2021/0400567 A1* | 12/2021 | Sha | H04W 76/27 |
| 2022/0007391 A1* | 1/2022 | Höglund | H04W 72/21 |
| 2022/0225258 A1* | 7/2022 | Ratasuk | H04W 56/0045 |

OTHER PUBLICATIONS

LG Electronics, "Discussion on preconfigured UL resources in MTC," 3GPP TSG RAN WG1 Meeting #95, R1-1812528, Nov. 2018, 9 pages.

MediaTek Inc., "Early transmission in preconfigured UL resources in Nb-Iot," 3GPP TSG RAN WG1 Meeting #96bis, R1-1904161, Apr. 2019, 6 pages.

Ericsson, "Support for transmission in preconfigured UL resources in LTE-MTC," 3GPP TSG-RAN WG1 Meeting #96bis, R1-1903883, Apr. 2019, 16 pages.

ZTE Corporation et al., "Further consideration on UL aspects of D-PUR in IDLE," 3GPP TSG-RAN2 meeting#105bis, R2-1903485, Apr. 2019, 11 pages.

* cited by examiner

[FIG. 1]
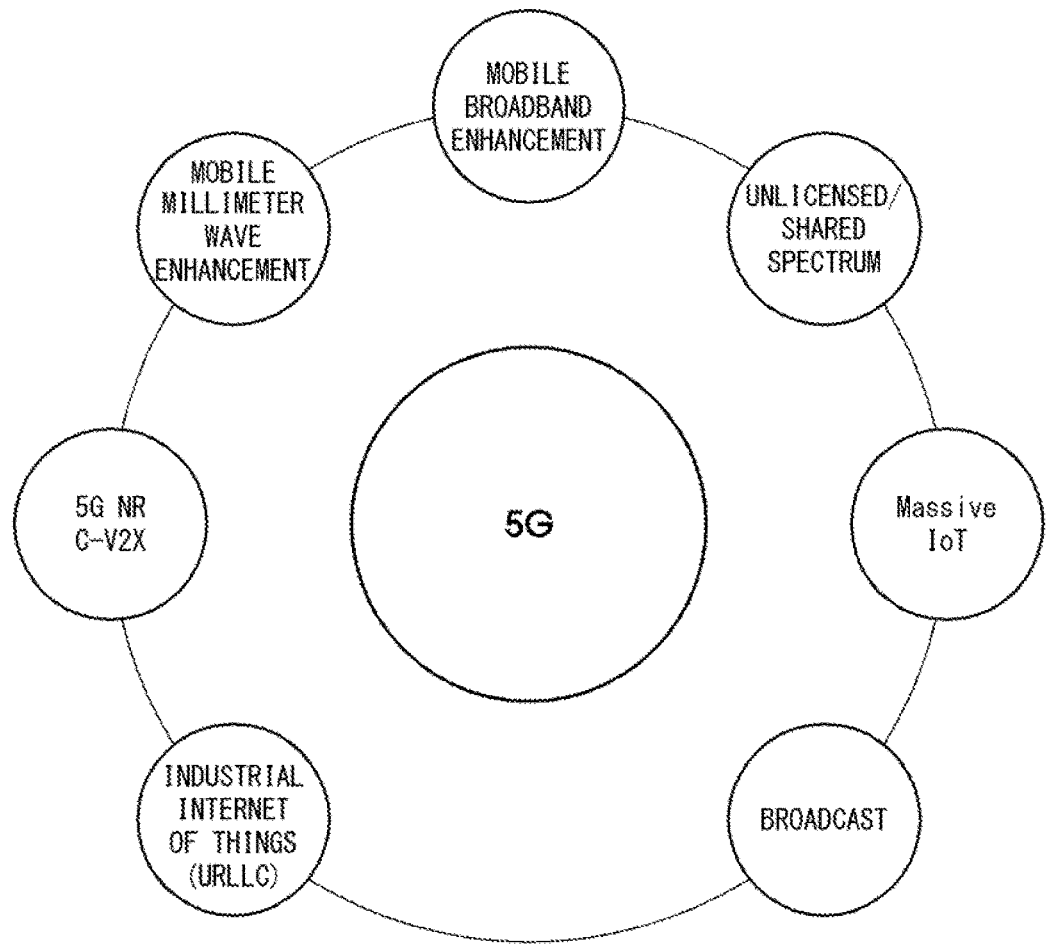
[FIG. 2]
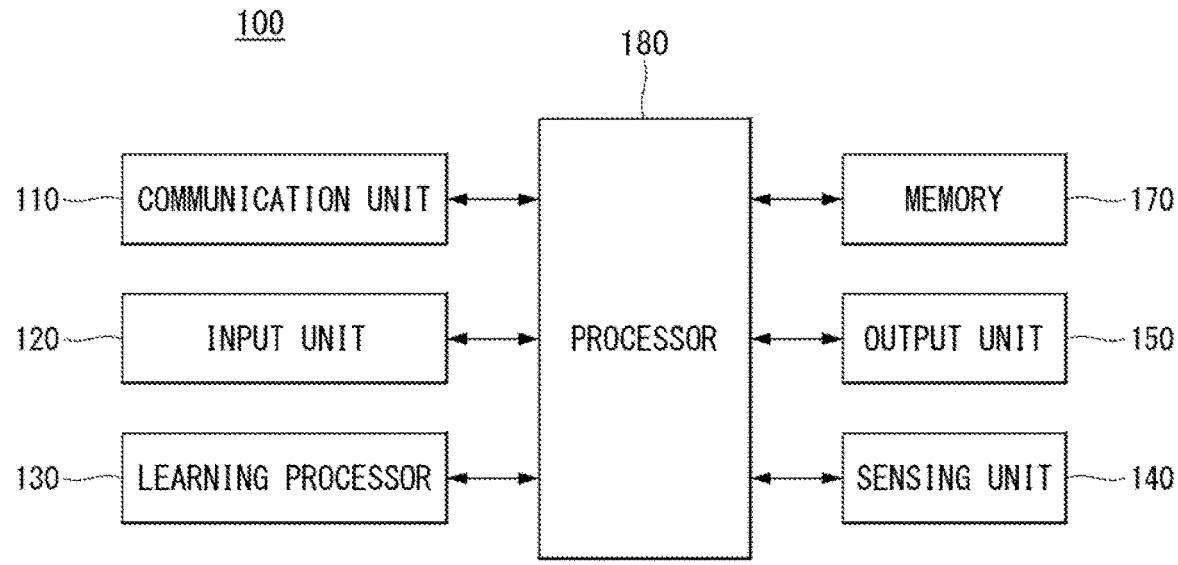

[FIG. 3]
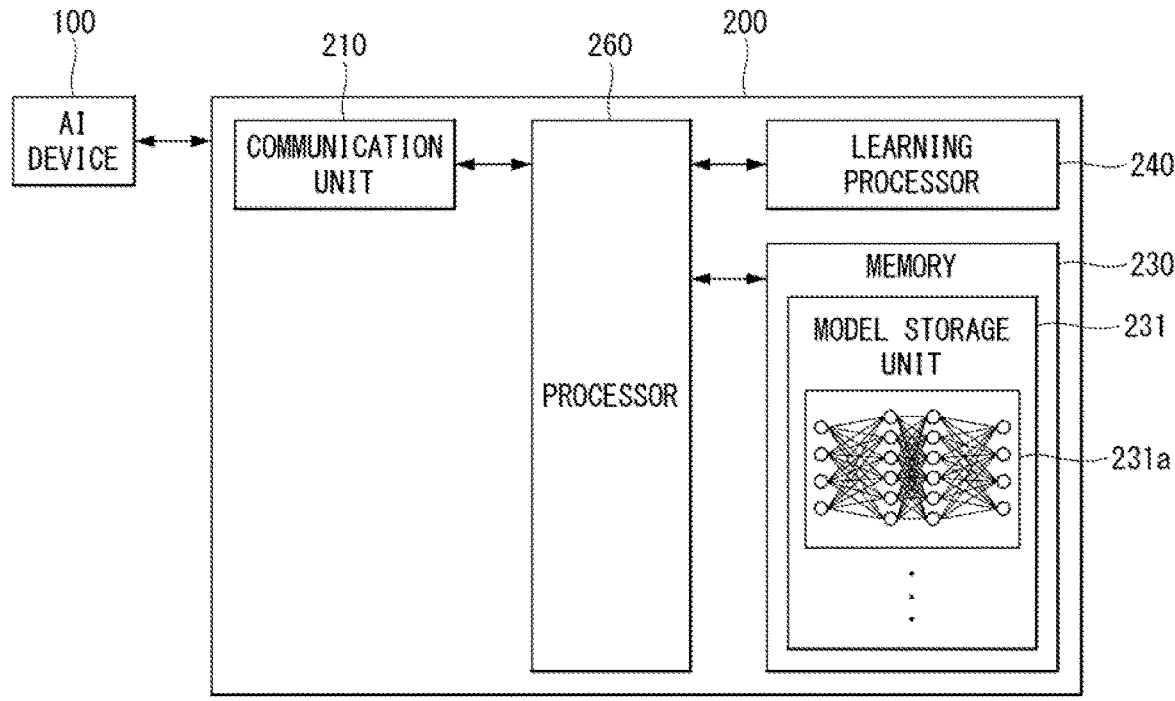
[FIG. 4]
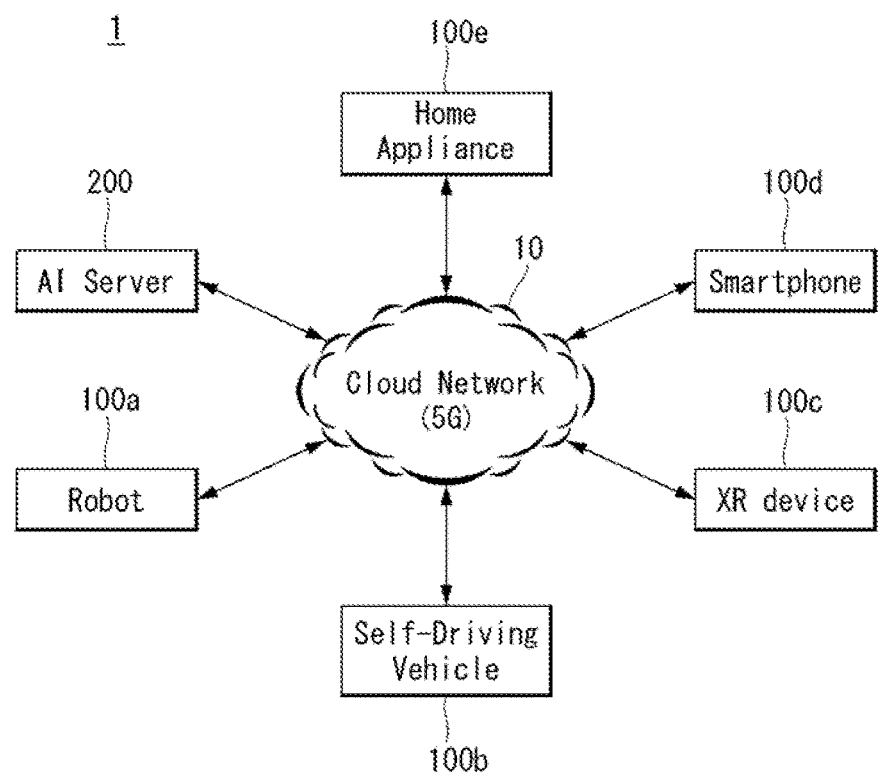

[FIG. 5]
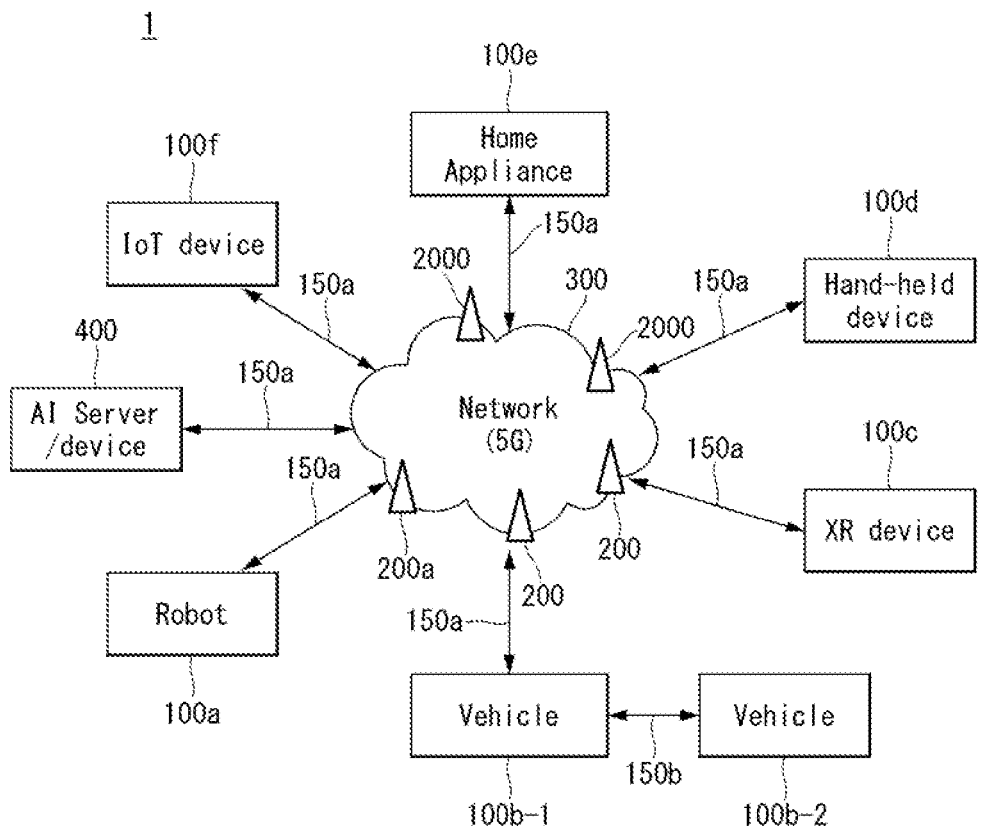
[FIG. 6]
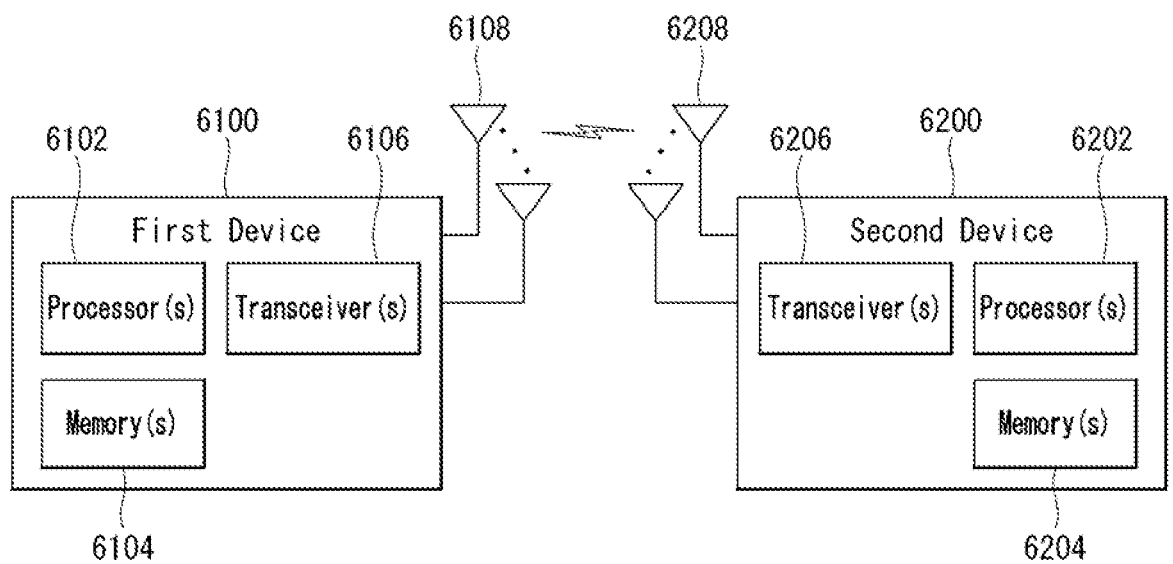

[FIG. 7]
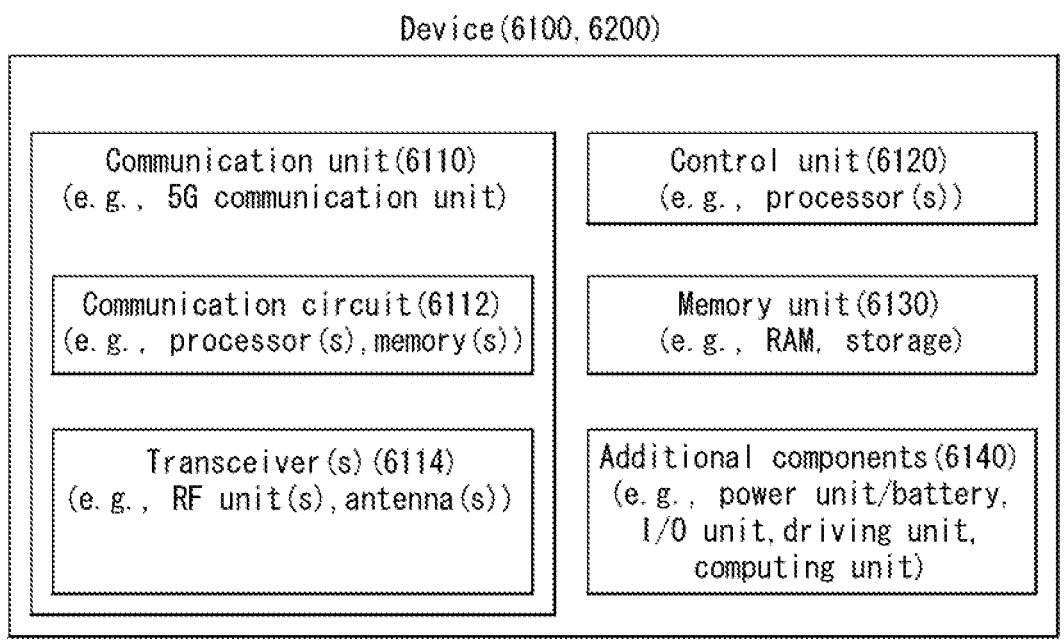
[FIG. 8]
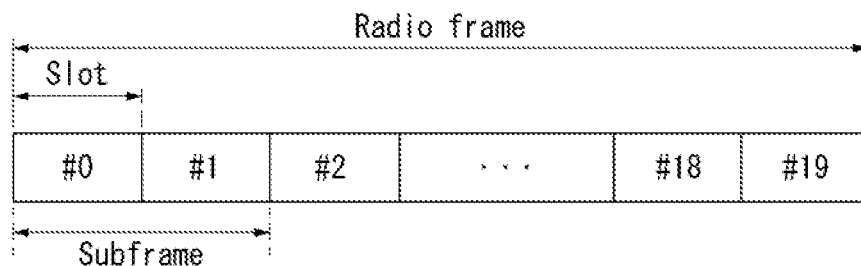

[FIG. 9]
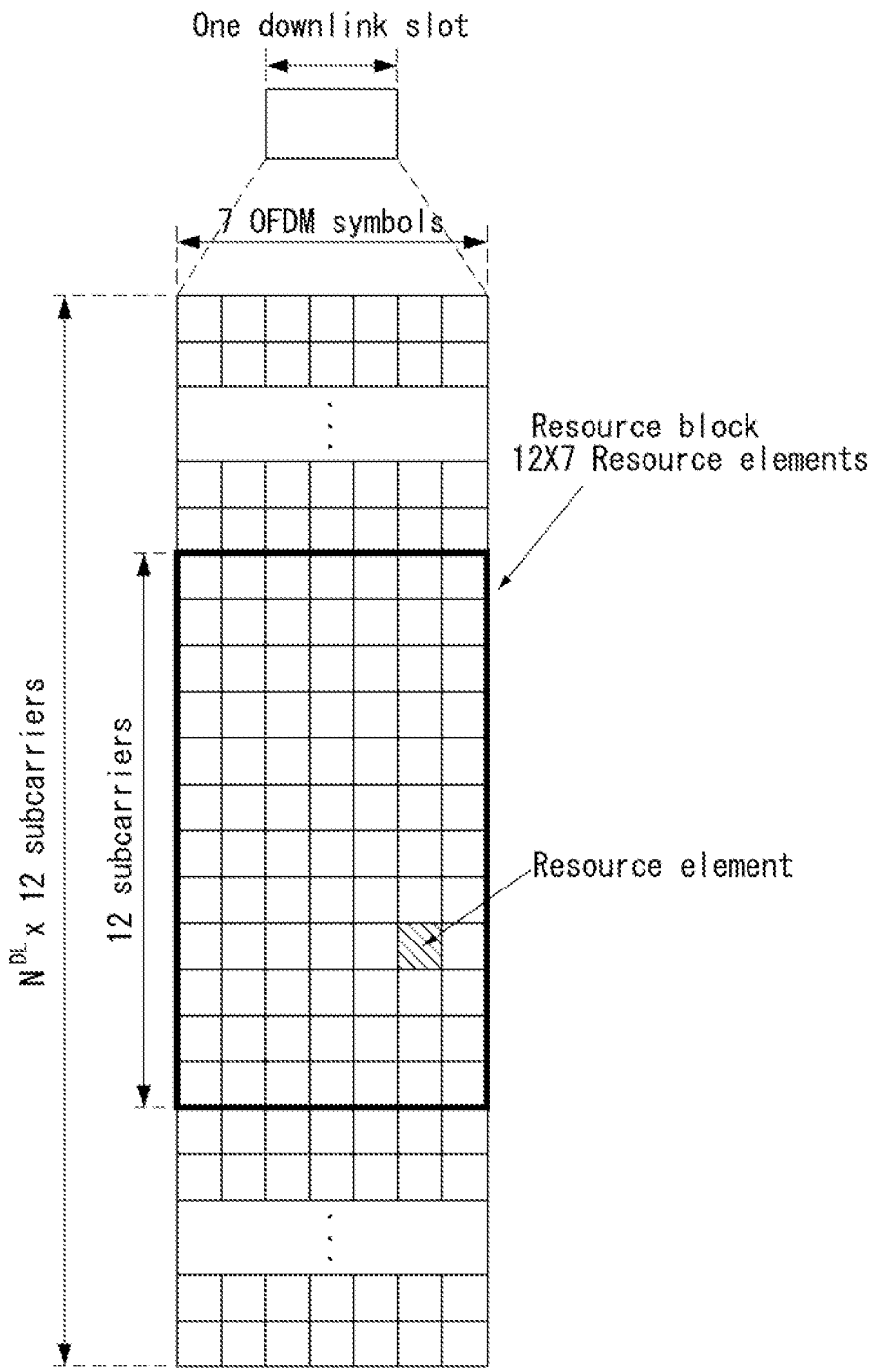

[FIG. 10]
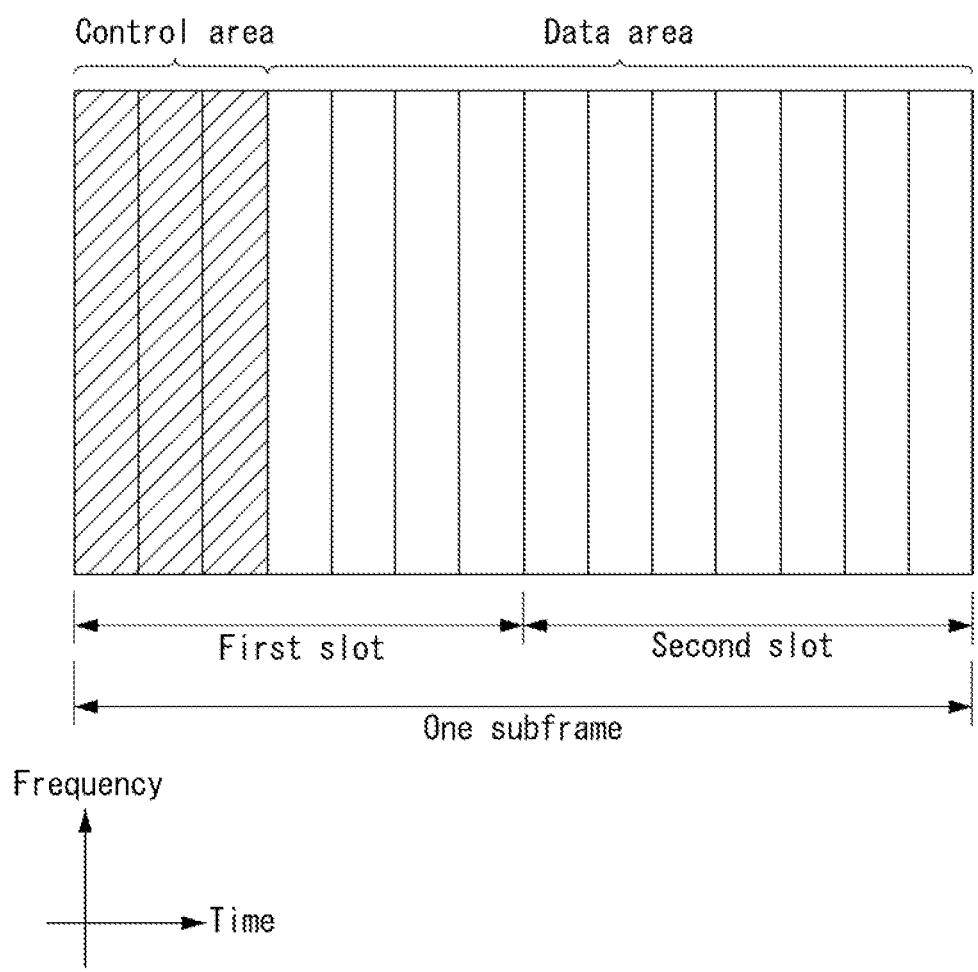

[FIG. 11]
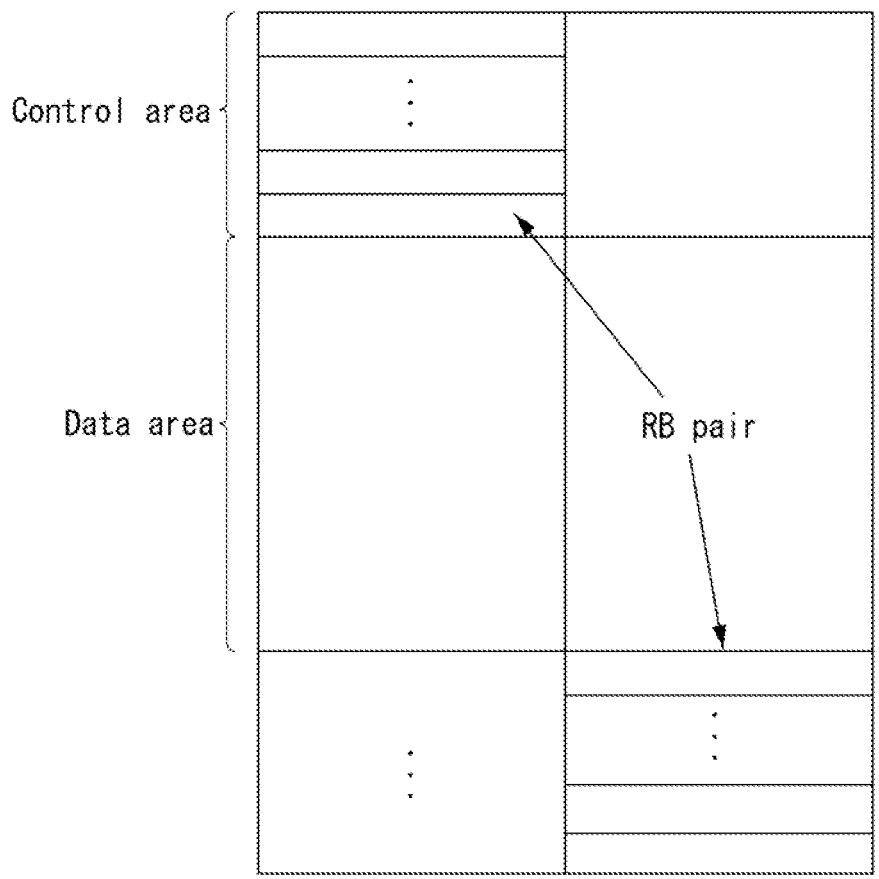
[FIG. 12]
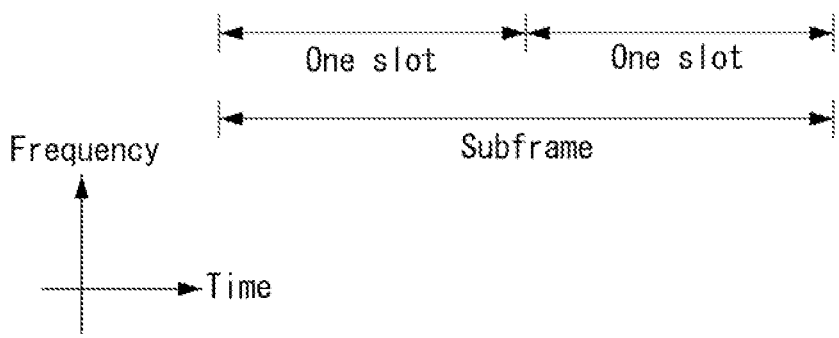

[FIG. 13]
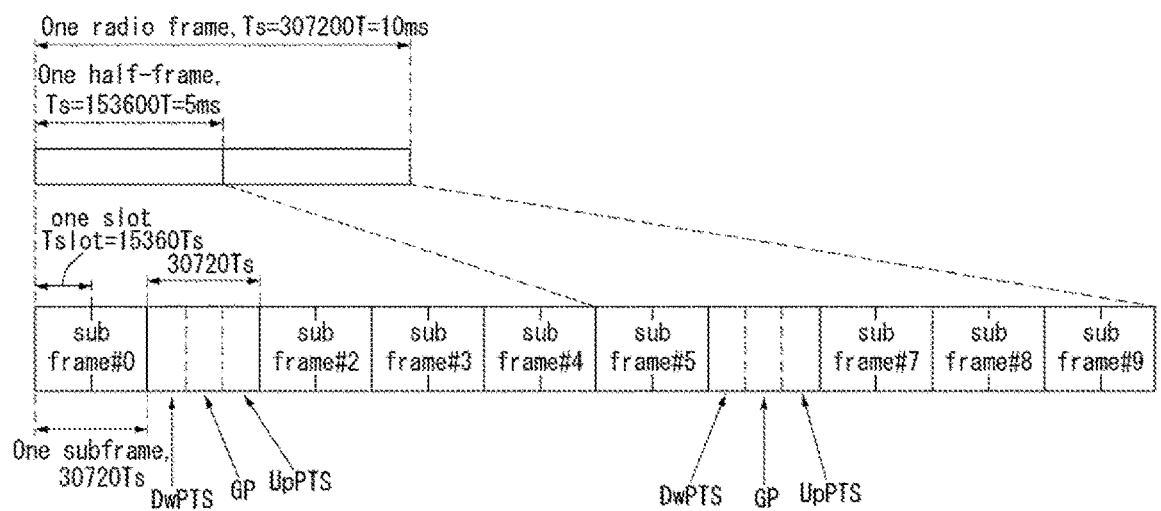

[FIG. 14]
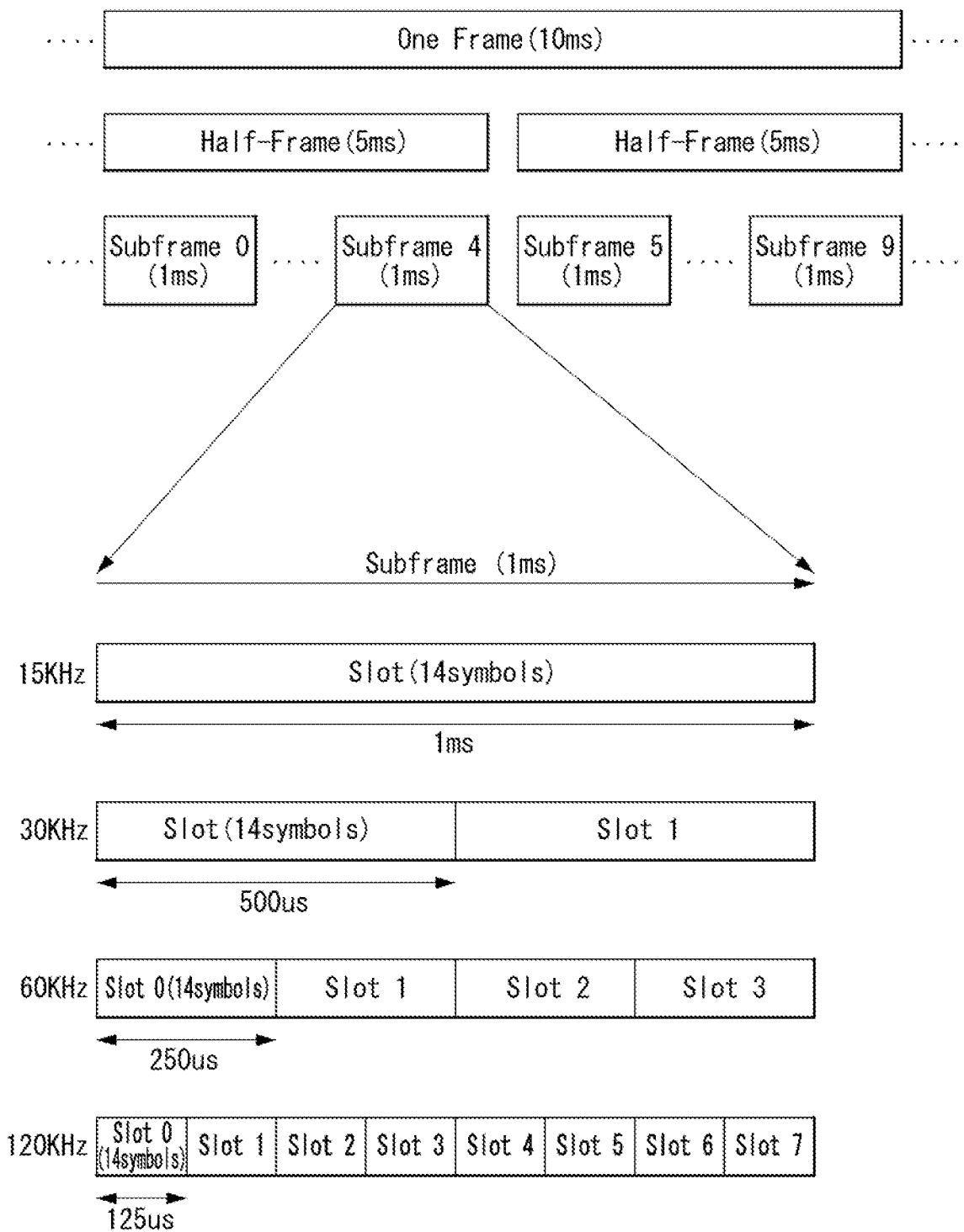

[FIG. 15]
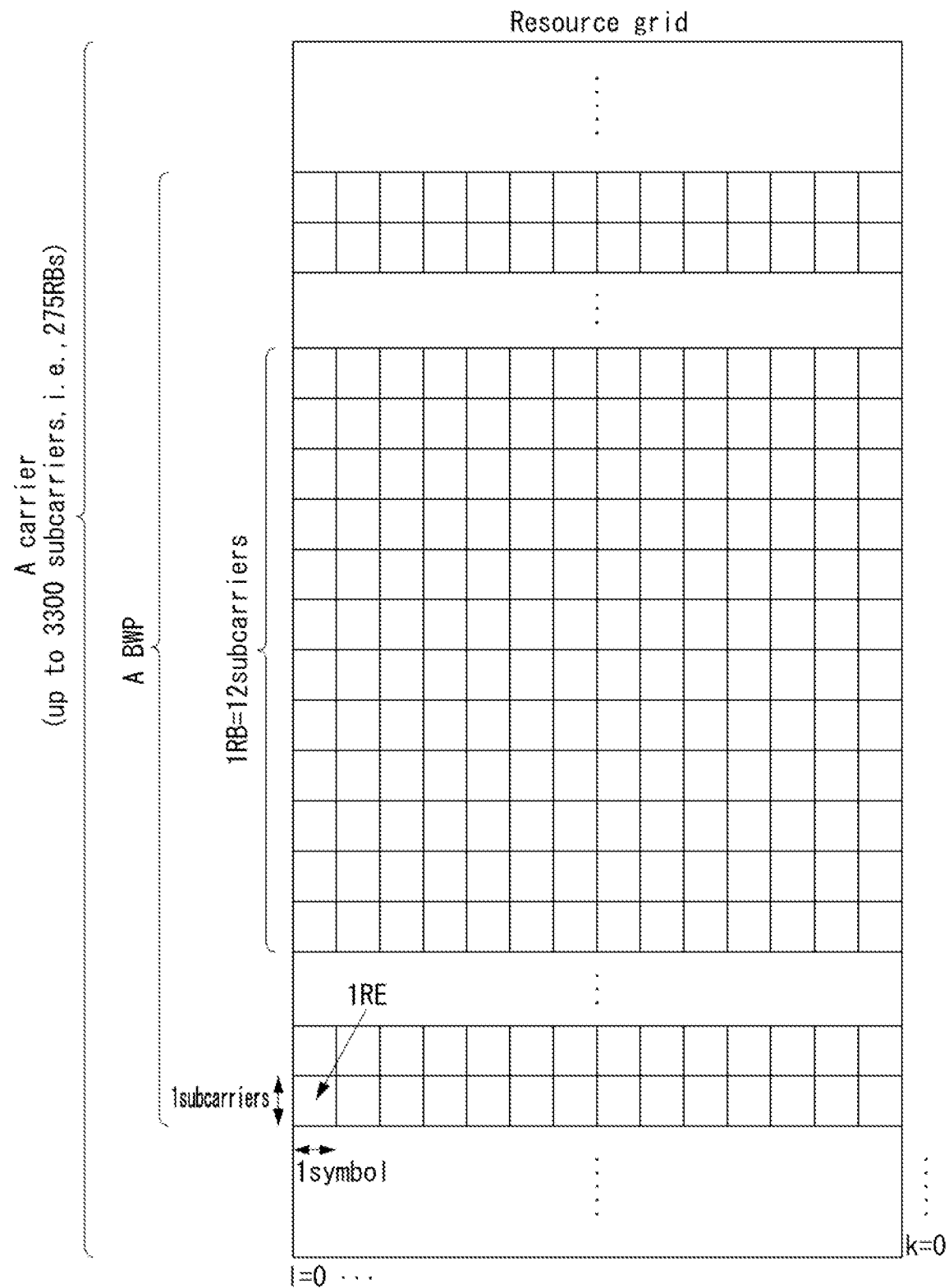

[FIG. 16]
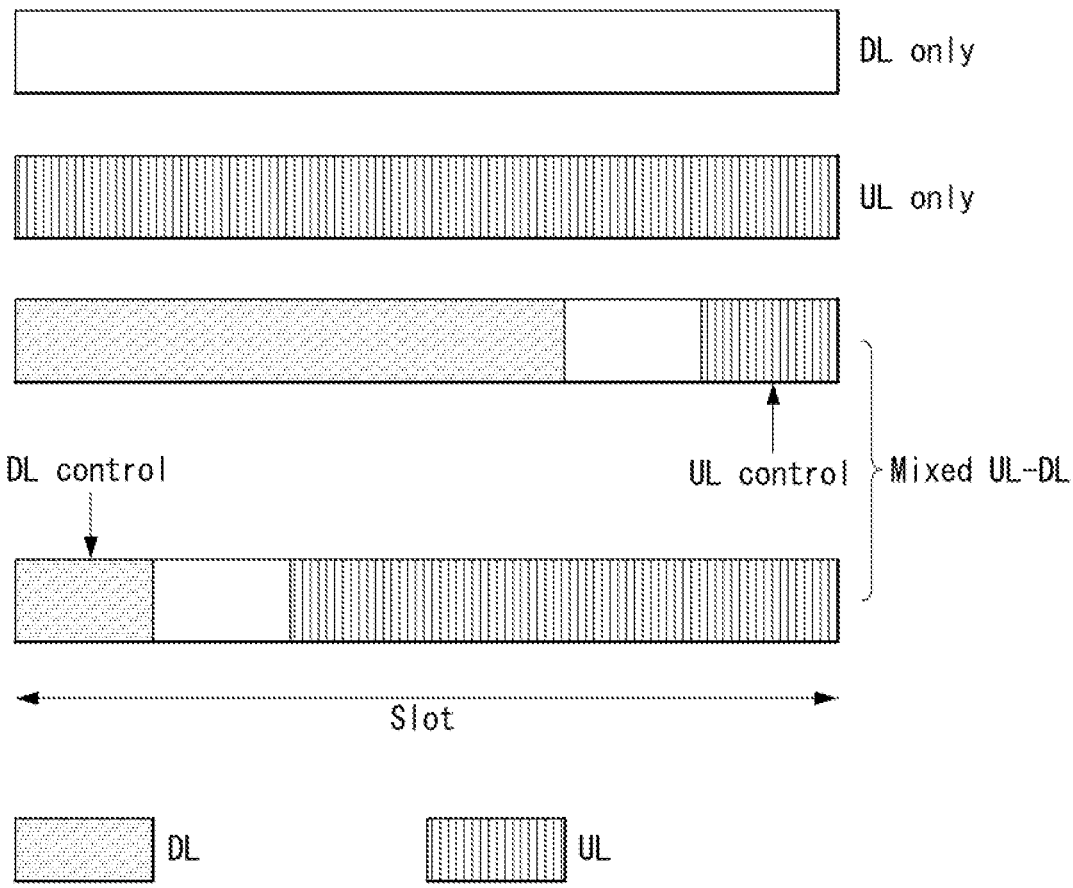
[FIG. 17]
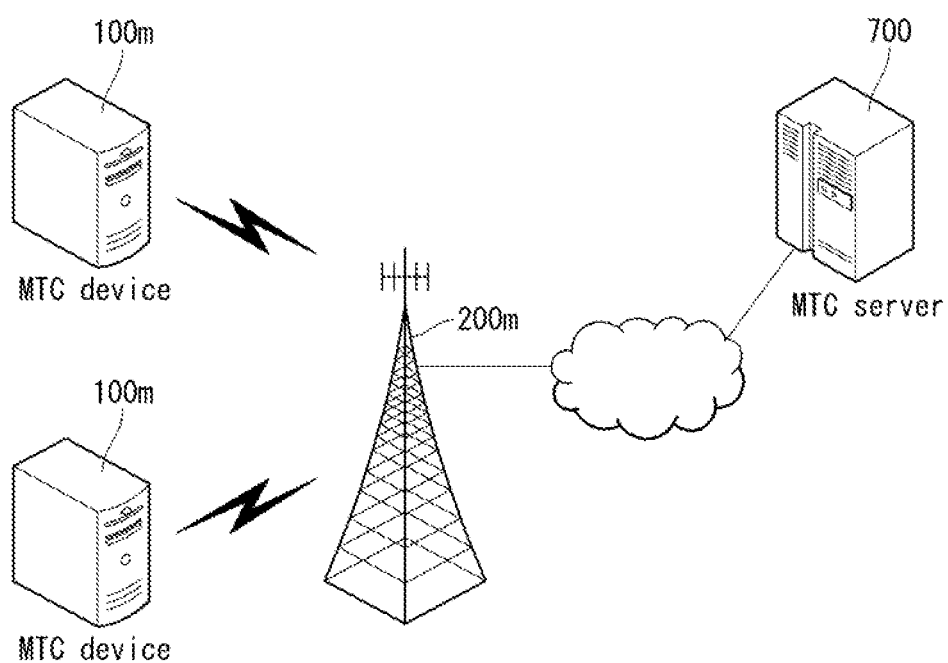

[FIG. 18]
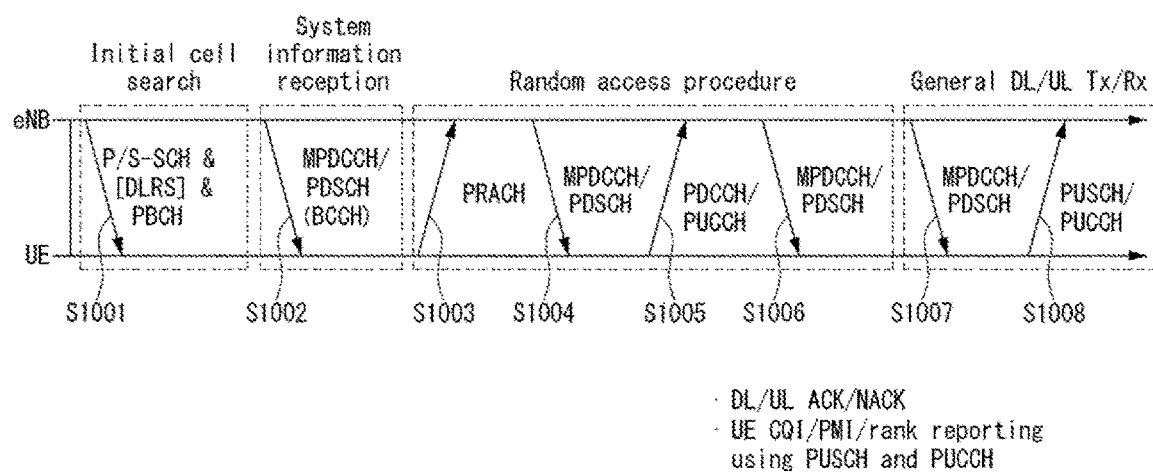

[FIG. 19]
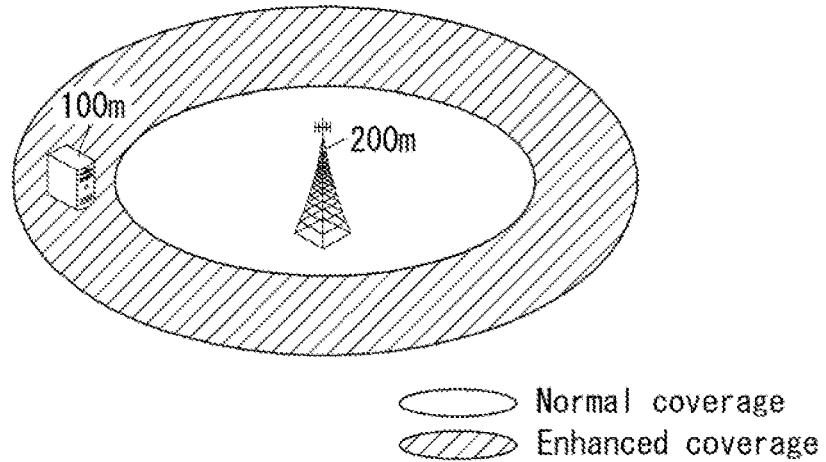
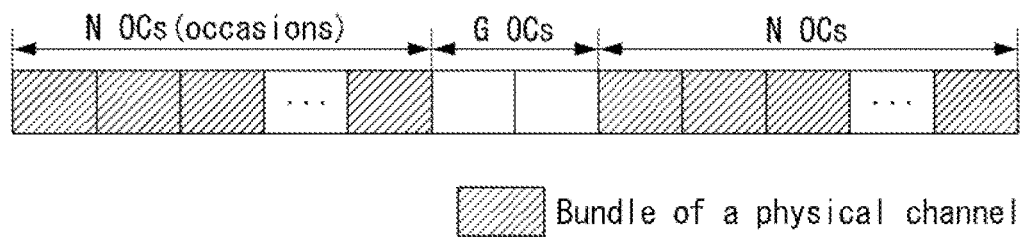
[FIG. 20]
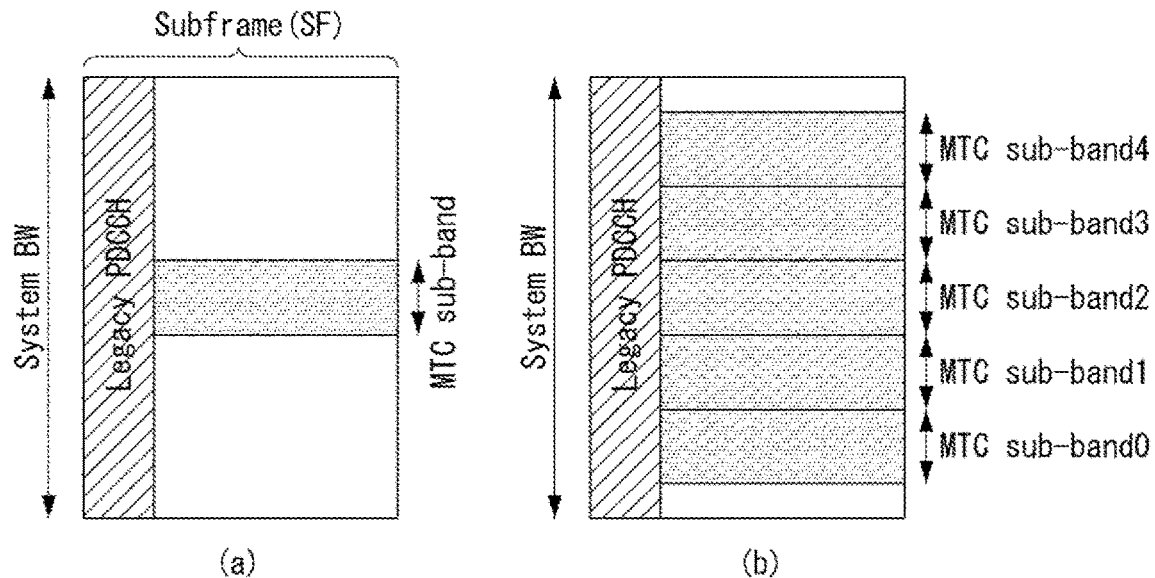

[FIG. 21]
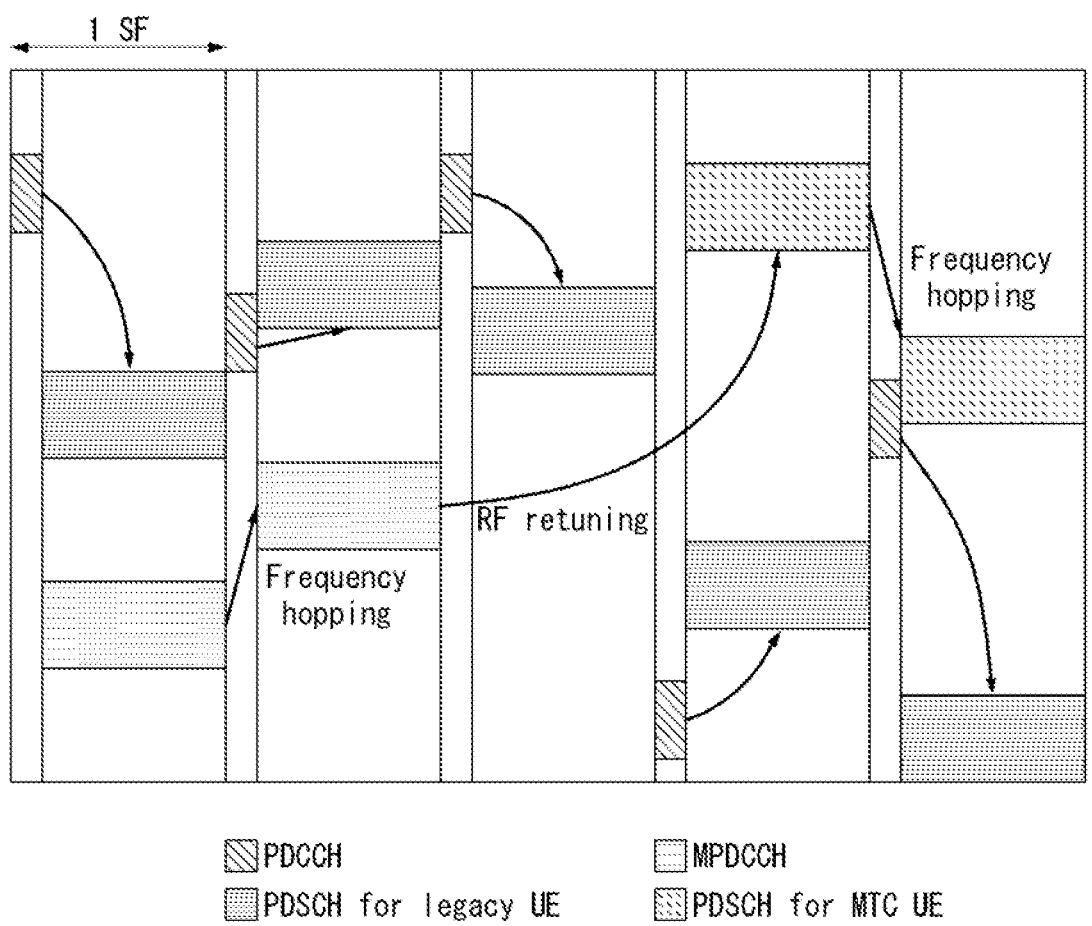

[FIG. 22]
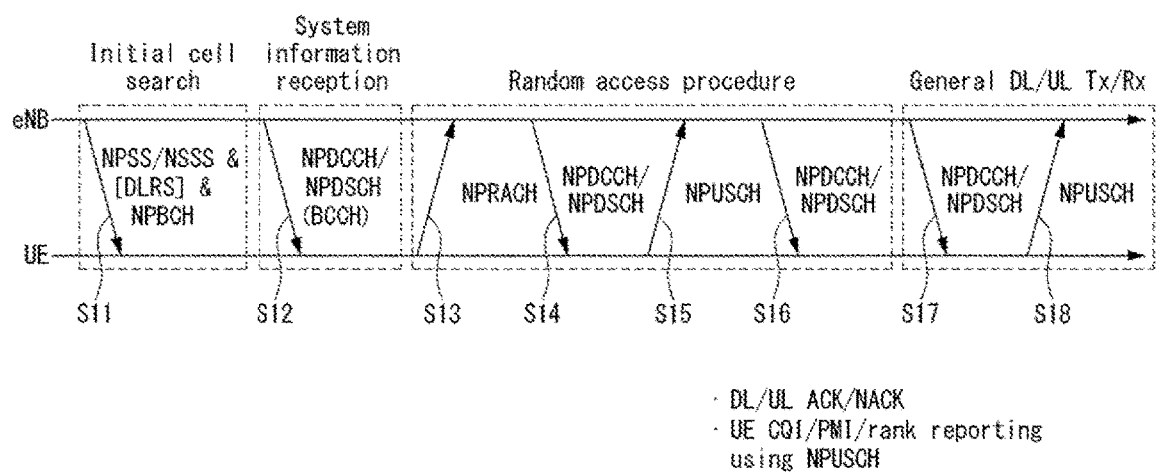

[FIG. 23]
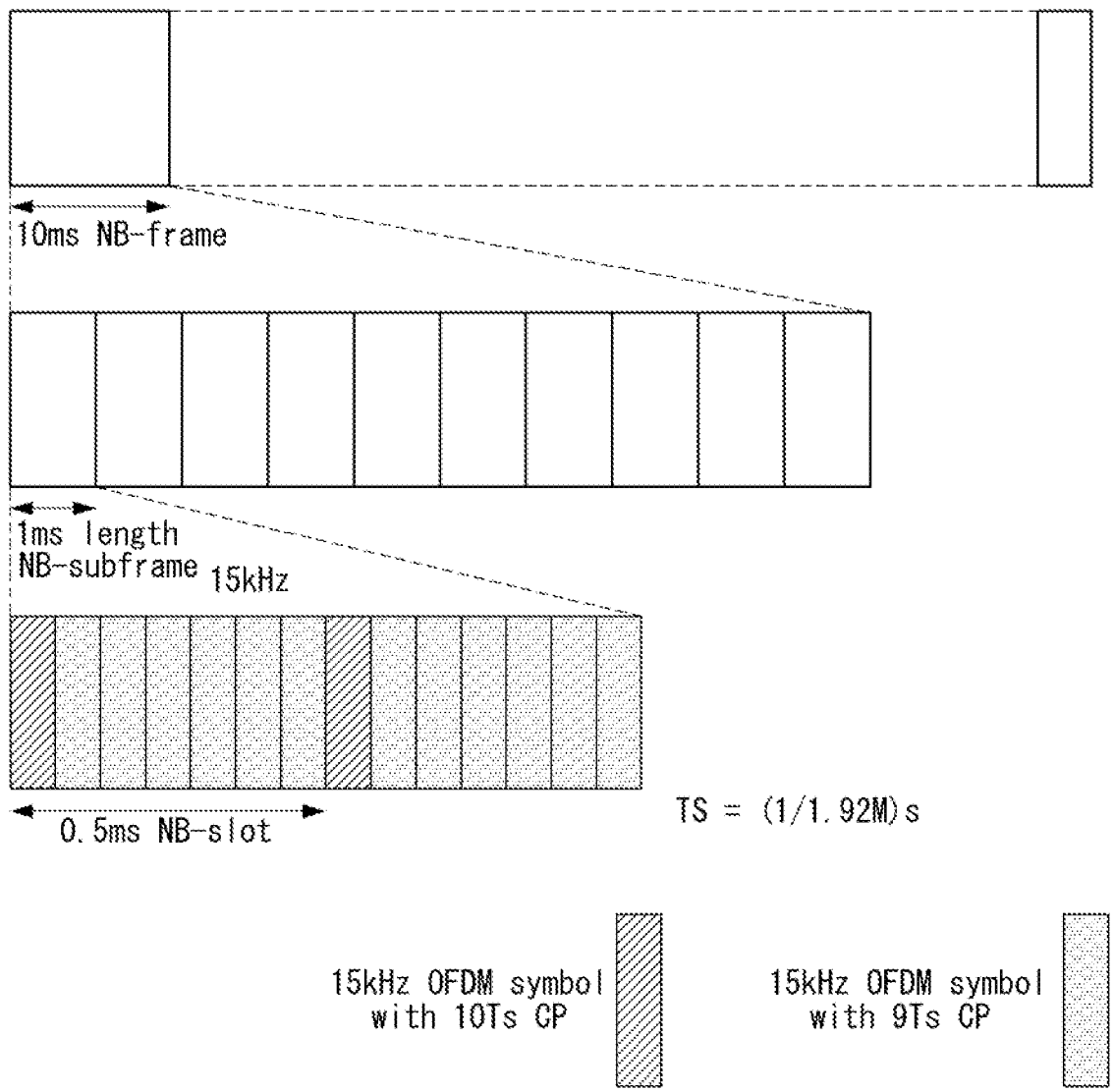

[FIG. 24]
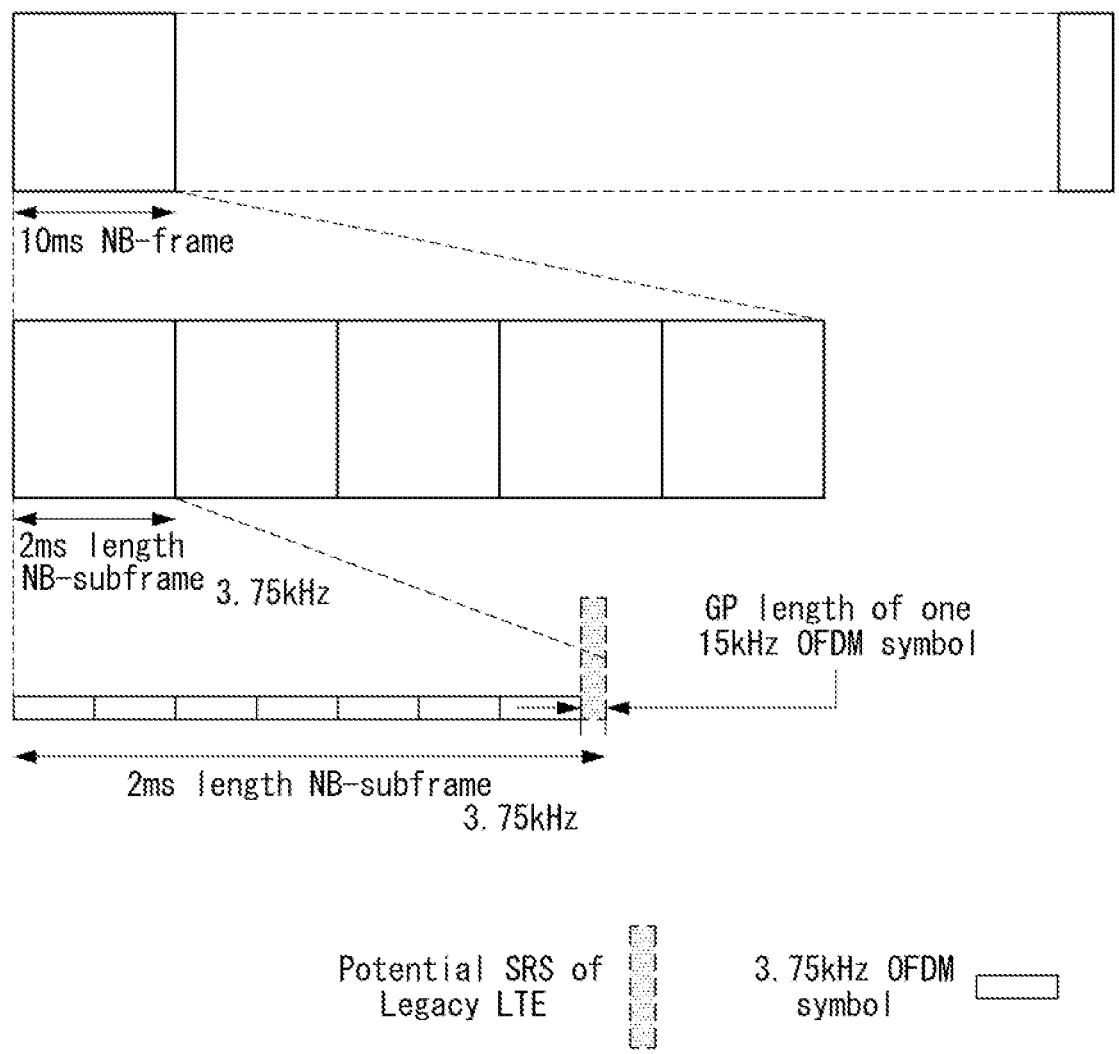

[FIG. 25]
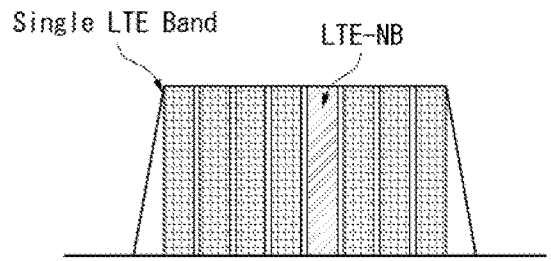
(a) In-band system
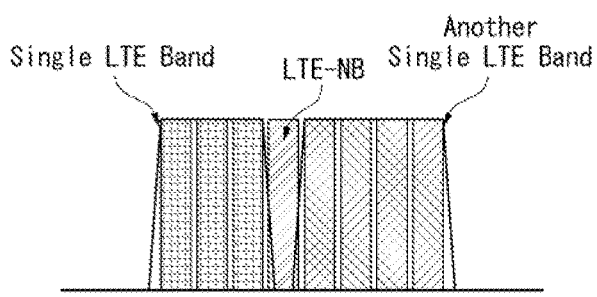
(b) Guard-band system
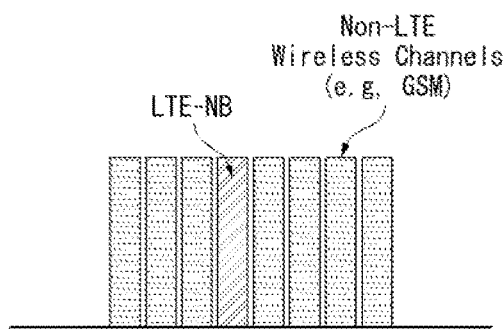
(c) Stand-alone system
[FIG. 26]
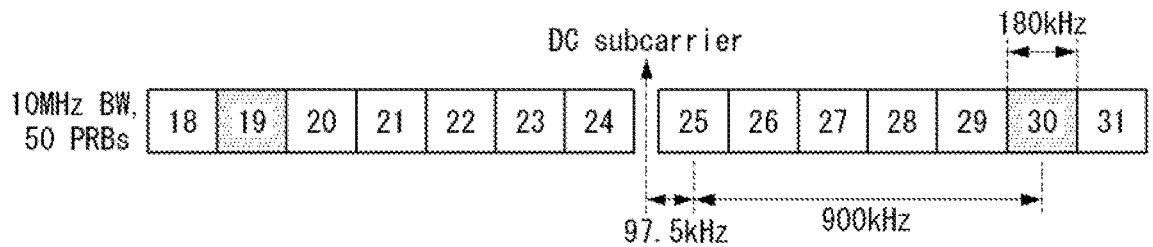

[FIG. 27]
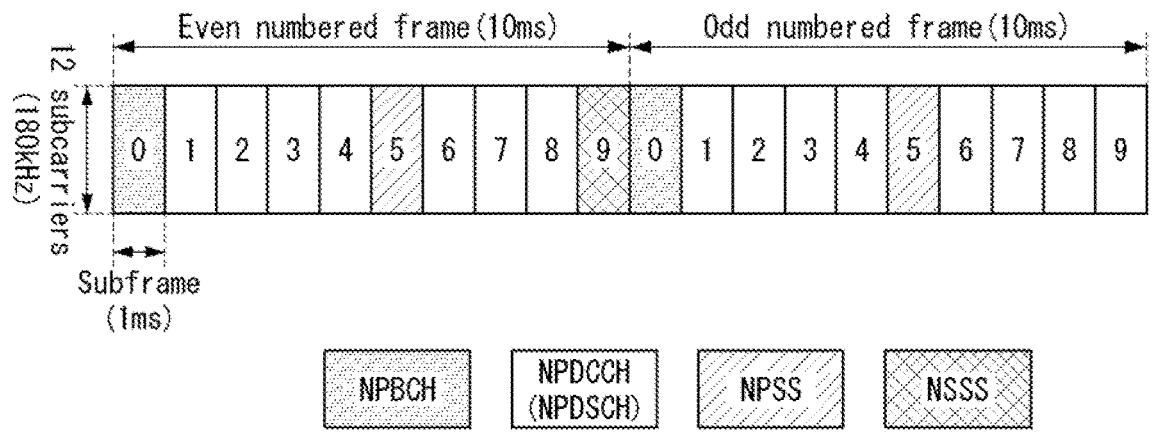
[FIG. 28]
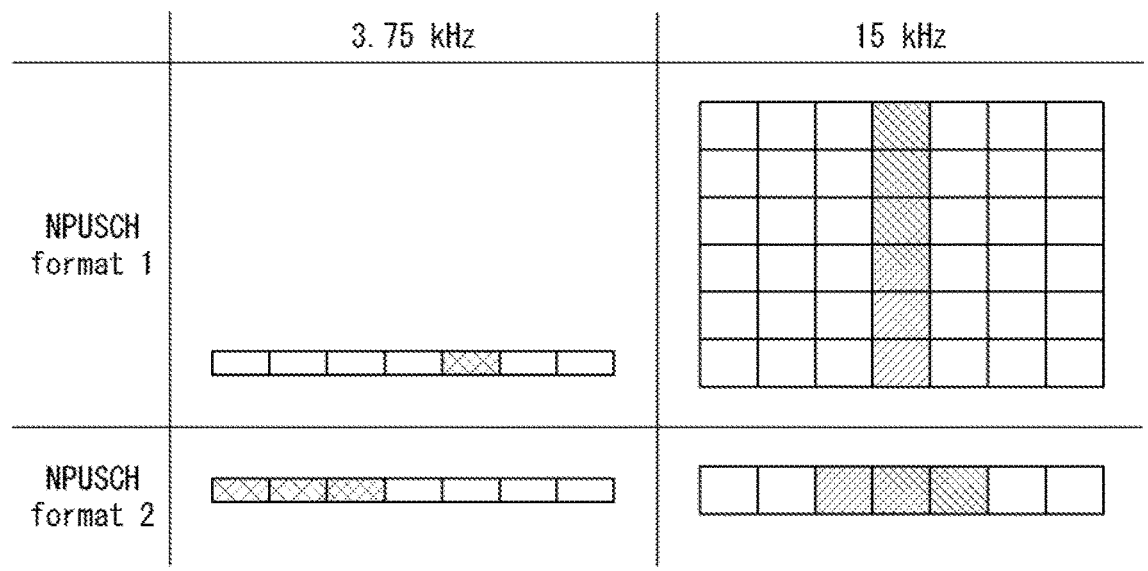

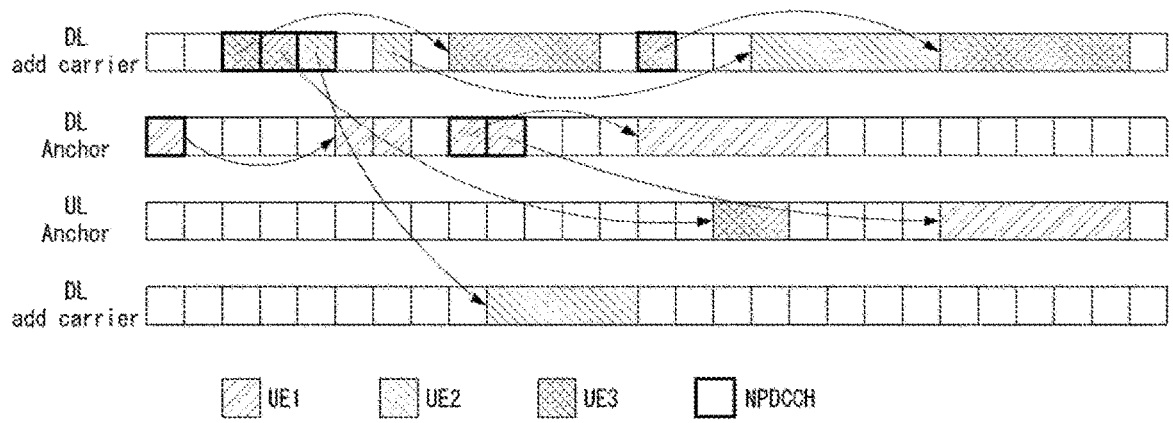
[FIG. 29]

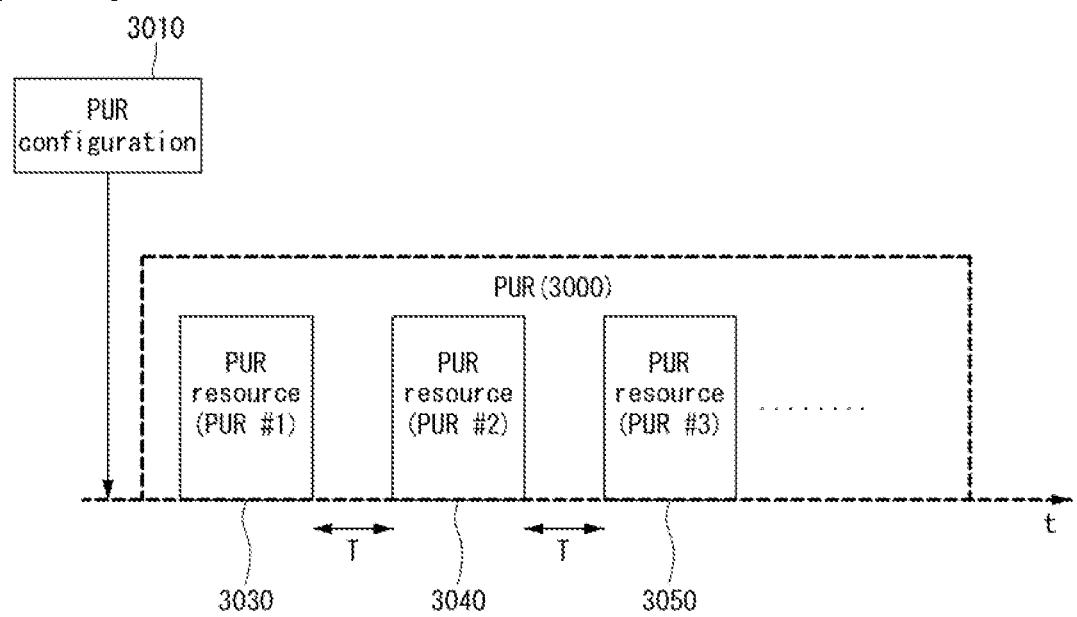
[FIG. 30]

[FIG. 31]
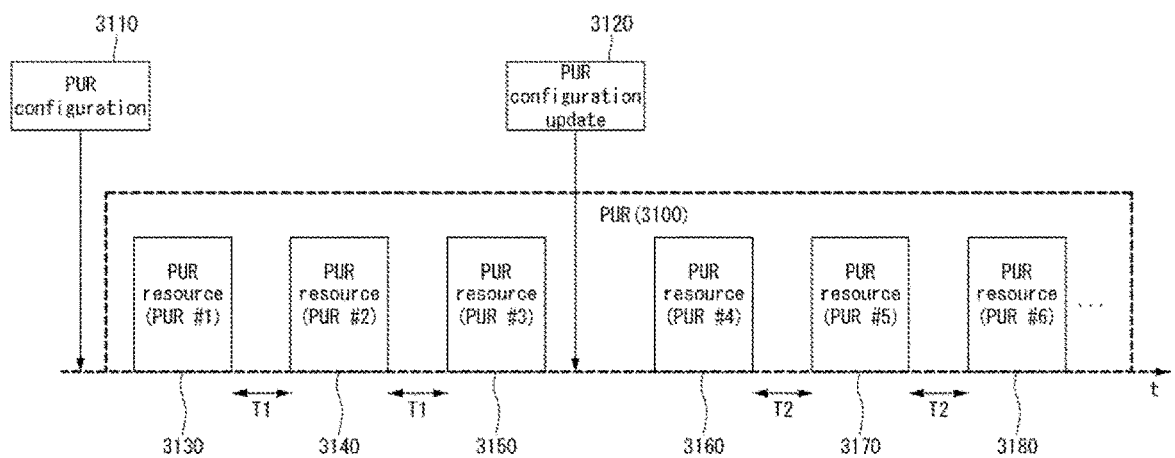

[FIG. 32]
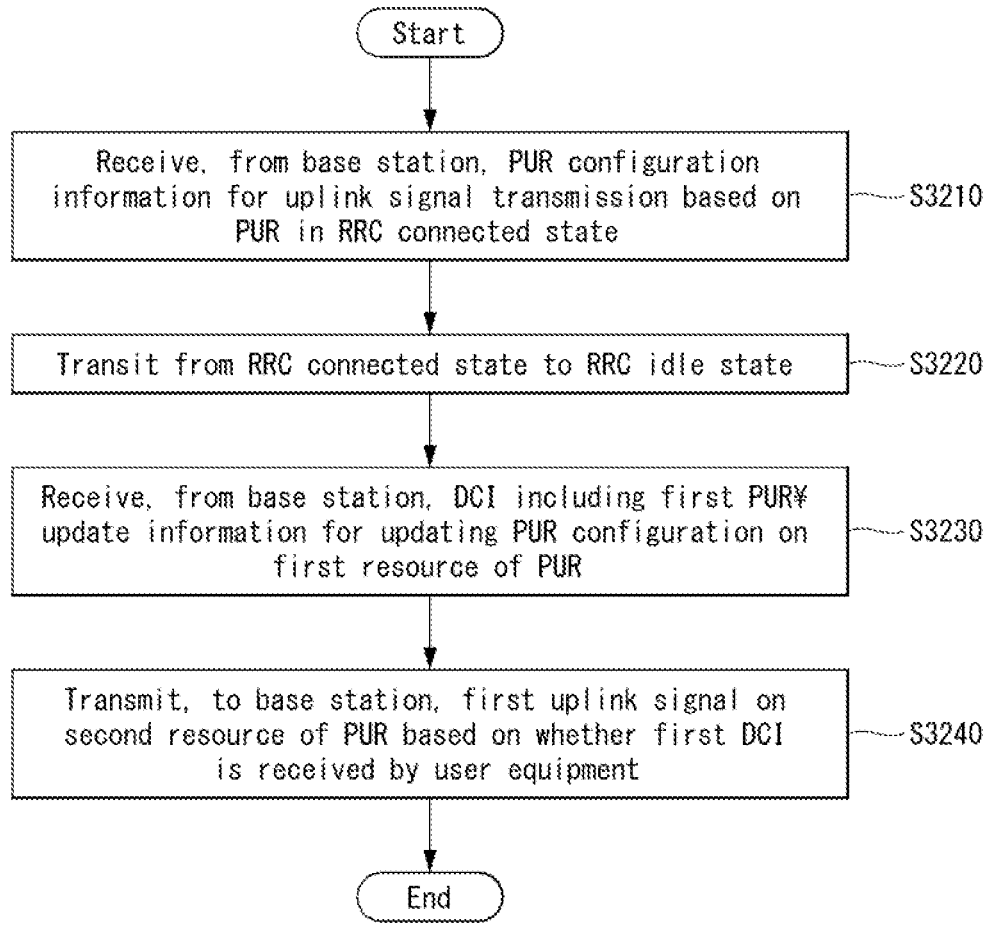
[FIG. 33]
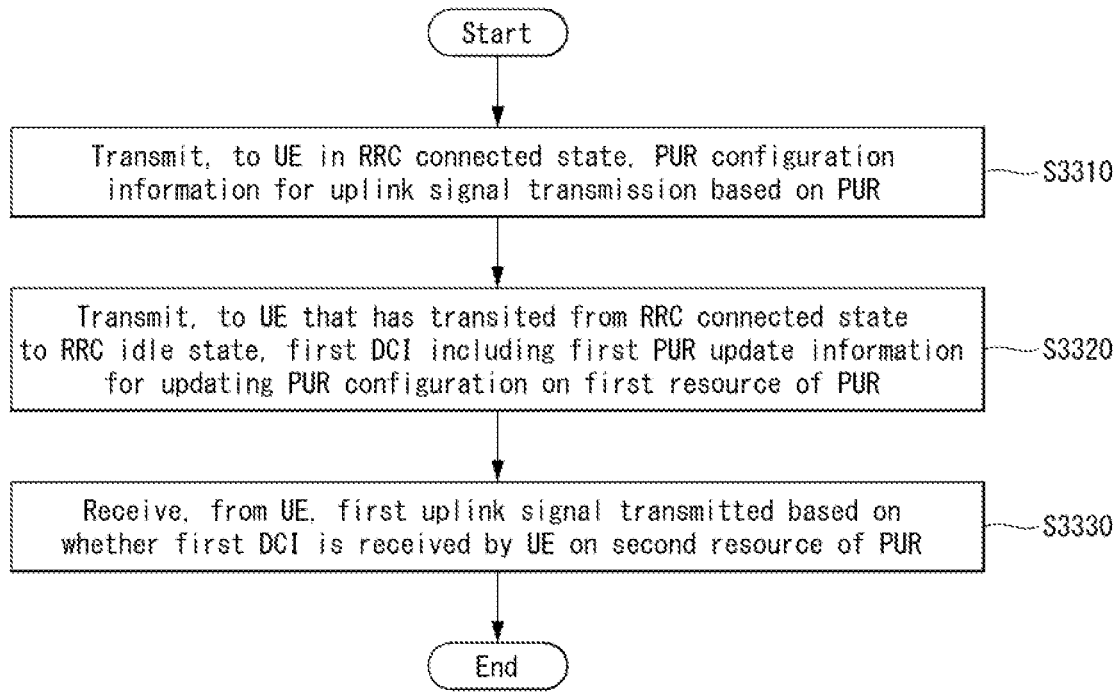

METHOD FOR TRANSMITTING UPLINK THROUGH PRECONFIGURED UPLINK RESOURCE IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/005907, filed on May 4, 2020, which claims the benefit of earlier filing date and right of priority to Korean Patent Application Nos. 10-2019-0052604, filed on May 3, 2019, and 10-2019-0055268, filed on May 10, 2019, the contents of which are all incorporated by reference herein in their entireties.

TECHNICAL FIELD

The present disclosure relates to a wireless communication system, and more particularly, to a method and apparatus for performing uplink transmission through a preconfigured uplink resource.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DISCLOSURE

Technical Problem

The present disclosure provides an uplink transmission method through a preconfigured uplink resource (PUR) and an apparatus therefor.

Furthermore, the present disclosure provides a method and apparatus for improving reliability in the execution of a PUR configuration update through a preconfigured uplink resource.

Furthermore, the present disclosure provides a method and apparatus for performing PUR search space (SS) monitoring through a preconfigured uplink resource.

The technical objects of the present disclosure are not limited to the aforementioned technical objects, and other technical objects, which are not mentioned above, will be apparently appreciated by a person having ordinary skill in the art from the following description.

Technical Solution

The present disclosure discloses method for transmitting uplink through preconfigured uplink resource in wireless communication system and device therefor Specifically, A method by a user equipment for transmitting an uplink signal through a preconfigured uplink resource (PUR) in a wireless communication system, the method comprising: receiving, from a base station, PUR configuration information for uplink signal transmission based on the PUR, in a radio resource control (RRC) connected state; transitioning from the RRC connected state to an RRC idle state; receiving, from the base station, first downlink control information (DCI) including first PUR update information for updating a PUR configuration on a first resource of the PUR; and transmitting, to the base station, a first uplink signal on a second resource of the PUR based on whether the first DCI is received by the user equipment, wherein based on that the user equipment succeeds in receiving the first DCI, the first uplink signal is transmitted by applying the PUR configuration based on the first PUR update information regardless of whether data for uplink transmission on the second resource is present.

Furthermore, in the present disclosure, wherein based on the data for the uplink transmission on the second resource being not generated, the first uplink signal includes dummy data or a same data as specific uplink data transmitted on a resource before the second resource.

Furthermore, in the present disclosure, wherein the second resource to which the first uplink signal is transmitted is counted as a skipping event by a PUR skipping counter for releasing the PUR.

Furthermore, in the present disclosure, wherein based on a value of the PUR skipping counter reaching a specific threshold for releasing the PUR by the second resource being counted as the skipping event, transmission of the first uplink signal is dropped and the PUR is released.

Furthermore, in the present disclosure, wherein based on the data for the uplink transmission on the second resource being generated, the first uplink signal includes the generated data.

Furthermore, in the present disclosure, The method of claim 1, wherein based on that (i) the user equipment fails to receive the DCI and (ii) the data for the uplink transmission on the second resource is not generated, further comprising: skipping transmission of the first uplink signal on the second resource.

Furthermore, in the present disclosure, further comprising: receiving, from the base station, indication information indicating to perform monitoring for reception of second PUR update information after skipping transmission of the first uplink signal even when the data for the uplink transmission on the second resource is not generated, wherein the indication information is included in at least one of the PUR configuration information and the DCI.

Furthermore, in the present disclosure, wherein the monitoring is performed in at least one of PUR search space (SS) or machine type communication physical downlink control channel search space (MPDCCH SS).

Furthermore, in the present disclosure, further comprising: receiving, from the base station, second DCI including the second PUR update information based on skipping of the transmission of the first uplink signal on the second resource.

Furthermore, in the present disclosure, wherein based on that (i) the user equipment fails to receive the DCI, and (ii) the data for the uplink transmission on the second resource is generated, the first uplink signal includes the generated data and is transmitted by applying the PUR configuration based on the first PUR configuration information.

Furthermore, in the present disclosure, wherein based on the PUR configuration being updated, a specific offset value for indicating to the base station whether the PUR configuration is updated is applied to values of some parameters which are semi-statically configured, among parameters related to the PUR configuration, wherein the first uplink signal is transmitted based on the values of the some parameters to which the specific offset value is applied, and wherein the specific offset value is included in the first DCI.

Furthermore, in the present disclosure, wherein based on the some parameters are a demodulation reference signal (DM-RS) pattern, the specific offset value is applied to at least one of a DM-RS sequence, a cyclic shift, or an orthogonal cover code (OCC).

Furthermore, in the present disclosure, wherein the first uplink signal includes indication information for whether the PUR configuration is updated, and wherein based on the data for the uplink transmission on the second resource being not generated, (i) the indication information is included in the first uplink signal by replacing dummy data by a MAC (medium access control) CE (control element) related to the indication information or (ii) the indication information is included in the first uplink signal in a form in which the MAC CE is multiplexed at MAC level with all or part of data same with the specific uplink data transmitted on the resource before the second resource, and based on the data for the uplink transmission on the second resource being generated, the indication information is included in the first uplink signal in a form in which the MAC CE is multiplexed with the generated data at the MAC level.

Furthermore, in the present disclosure, wherein the first uplink signal includes uplink control information (UCI) including indication information indicating whether the PUR configuration is updated, and wherein (i) the UCI is punctured with uplink data included in the first uplink signal or (ii) the uplink data is rate-matched with the UCI.

Furthermore, in the present disclosure, wherein at least one parameter among parameters related to the PUR configuration configured based on the PUR configuration information is updated based on the first PUR update information, and wherein at least one of (i) information on whether each of the at least one parameter is updated, (ii) information on whether to some or all of the at least one parameter, or (iii) information on whether a specific parameter group which is grouped among the at least one or more parameter is included in the indication information.

Furthermore, in the present disclosure, a user equipment for transmitting an uplink signal through a preconfigured uplink resource (PUR) in a wireless communication system, the user equipment comprising: a transmitter for transmitting a radio signal; a receiver for receiving the radio signal; and a processor operatively coupled to the transmitter and the receiver, wherein the processor is configured to control: the receiver to receive, from a base station, PUR configuration information for uplink signal transmission based on the PUR, in a radio resource control (RRC) connected state; to transit from the RRC connected state to an RRC idle state; the receiver to receive, from the base station, first downlink control information (DCI) including first PUR update information for updating a PUR configuration on a first resource of the PUR; and the transmitter to transmit, to the base station, a first uplink signal on a second resource of the PUR based on whether the first DCI is received, wherein based on that the user equipment succeeds in receiving the first DCI, the first uplink signal is transmitted by applying the PUR configuration based on the first PUR update information regardless of whether data for uplink transmission on the second resource is present.

Furthermore, in the present disclosure, a method by a base station for receiving an uplink signal through a preconfigured uplink resource (PUR) in a wireless communication system, the method comprising: transmitting, to a user equipment in a radio resource control (RRC) connected state, PUR configuration information for uplink signal transmission based on the PUR; transmitting, to the user equipment transitioning from the RRC connected state to an RRC idle state, first downlink control information (DCI) including first PUR update information for updating a PUR configuration on a first resource of the PUR; and receiving, from the user equipment, a first uplink signal on a second resource of the PUR based on whether the first DCI is received by the user equipment, wherein based on that the user equipment succeeds in receiving the first DCI, the first uplink signal is transmitted by applying the PUR configuration based on the first PUR update information regardless of whether data for uplink transmission on the second resource is present.

Furthermore, in the present disclosure, a base station for receiving an uplink signal through a preconfigured uplink resource (PUR) in a wireless communication system, the base station comprising: a transmitter for transmitting a radio signal; a receiver for receiving the radio signal; and a processor operatively coupled to the transmitter and the receiver, wherein the processor is configured to control: the transmitter to transmit, to a user equipment in a radio resource control (RRC) connected state, PUR configuration information for uplink signal transmission based on the PUR; the transmitter to transmit, to the user equipment transitioning from the RRC connected state to an RRC idle state, first downlink control information (DCI) including first PUR update information for updating a PUR configuration on a first resource of the PUR; and the receiver to receive, from the user equipment, a first uplink signal on a second resource of the PUR based on whether the first DCI is received by the user equipment, wherein based on that the user equipment succeeds in receiving the first DCI, the first uplink signal is transmitted by applying the PUR configuration based on the first PUR update information regardless of whether data for uplink transmission on the second resource is present.

Furthermore, in the present disclosure, an apparatus comprising one or more memories and one or more processors operatively coupled to the one or more memories, the apparatus comprising: wherein the one or more processors control the apparatus to: receive, from a base station, PUR configuration information for uplink signal transmission based on the PUR, in a radio resource control (RRC) connected state; transit from the RRC connected state to an RRC idle state; receive, from the base station, first downlink control information (DCI) including first PUR update information for updating a PUR configuration on a first resource of the PUR; and transmit, to the base station, a first uplink signal on a second resource of the PUR based on whether the first DCI is received, wherein based on that the user equipment succeeds in receiving the first DCI, the first uplink signal is transmitted by applying the PUR configuration based on the first PUR update information regardless of whether data for uplink transmission on the second resource is present.

Furthermore, in the present disclosure, a non-transitory computer readable medium (CRM) storing one or more indications, comprising: wherein the one or more indications executable by the one or more processors causes a user equipment to: receive, from a base station, PUR configuration information for uplink signal transmission based on the PUR, in a radio resource control (RRC) connected state; transit from the RRC connected state to an RRC idle state; receive, from the base station, first downlink control information (DCI) including first PUR update information for updating a PUR configuration on a first resource of the PUR; and transmit, to the base station, a first uplink signal on a second resource of the PUR based on whether the first DCI is received, wherein based on that the user equipment succeeds in receiving the first DCI, the first uplink signal is transmitted by applying the PUR configuration based on the first PUR update information regardless of whether data for uplink transmission on the second resource is present.

Advantageous Effects

The present disclosure has an effect in that it can perform uplink transmission through a preconfigured uplink resource (PUR).

Furthermore, the present disclosure has an effect in that it can improve reliability of the execution of a PUR configuration update through a preconfigured uplink resource.

Furthermore, the present disclosure has an effect in that it can reliably perform PUR search space (SS) monitoring through a preconfigured uplink resource.

Advantages which can be obtained in the present disclosure are not limited to the aforementioned advantages and other unmentioned advantages will be clearly understood by those skilled in the art from the following description.

DESCRIPTION OF DRAWINGS

The accompanying drawings, which are included as part of the detailed description to help understand the present disclosure, provide embodiments of the present disclosure, and describe technical features of the present disclosure together with the detailed description.

FIG. 1 illustrates an example of 5G scenario to which the present disclosure may be applied.

FIG. 2 illustrates an AI device according to an embodiment of the present disclosure.

FIG. 3 illustrates an AI server according to an embodiment of the present disclosure.

FIG. 4 illustrates an AI system according to an embodiment of the present disclosure.

FIG. 5 illustrates a communication system applicable to the present disclosure.

FIG. 6 illustrates a wireless device applicable to the present disclosure.

FIG. 7 illustrates another example of the wireless device applicable to the present disclosure.

FIG. 8 is a diagram illustrating an example of an LTE radio frame structure.

FIG. 9 is a diagram illustrating an example of a resource grid for a downlink slot.

FIG. 10 illustrates an example of a structure of a downlink subframe.

FIG. 11 illustrates an example of a structure of an uplink subframe.

FIG. 12 illustrates an example of frame structure type 1.

FIG. 13 is a diagram illustrating another example of frame structure type 2. FIG. 13 illustrates a communication system applied to the present disclosure.

FIG. 14 illustrates a structure of a radio frame used in NR.

FIG. 15 illustrates a slot structure of an NR frame.

FIG. 16 illustrates a structure of a self-contained slot.

FIG. 17 illustrates MTC communication.

FIG. 18 illustrates physical channels used in MTC and general signal transmission using the same.

FIG. 19 illustrates cell coverage enhancement in MTC.

FIG. 20 illustrates a signal band for MTC.

FIG. 21 illustrates scheduling in legacy LTE and MTC.

FIG. 22 illustrates physical channels used in NB-IoT and general signal transmission using the same.

FIG. 23 illustrates a frame structure when a subframe spacing is 15 kHz and FIG. 24 illustrates a frame structure when a subframe spacing is 3.75 kHz.

FIG. 25 illustrates three operation modes of NB-IoT.

FIG. 26 illustrates a layout of an in-band anchor carrier at an LTE bandwidth of 10 MHz.

FIG. 27 illustrates transmission of an NB-IoT downlink physical channel/signal in an FDD LTE system.

FIG. 28 illustrates an NPUSCH format.

FIG. 29 is a diagram illustrating an example in which an anchor/non-anchor carrier is configured in different schemes for different UEs.

FIG. 30 is a diagram illustrating an example of a method of configuring a PUR resource in a UE.

FIG. 31 is a diagram illustrating an example of an operation of updating a PUR configuration of a UE.

FIG. 32 is a flowchart illustrating an example of an operation embodied in a UE, for performing, by the UE, a method of transmitting an uplink signal through a preconfigured uplink resource (PUR) in a wireless communication system, which is proposed in the present disclosure.

FIG. 33 is a flowchart illustrating an example of an operation embodied in a base station, for performing, by the base station, a method of receiving an uplink signal through a preconfigured uplink resource in a wireless communication system, which is proposed in the present disclosure.

MODE FOR DISCLOSURE

Hereinafter, preferred embodiments according to the present disclosure will be described in detail with reference to the accompanying drawings. The detailed description to be disclosed below with the accompanying drawings is intended to describe exemplary embodiments of the present disclosure, and is not intended to represent only embodiments in which the present disclosure may be practiced. The detailed description below includes specific details to provide a thorough understanding of the present disclosure. However, those skilled in the art appreciate that the present disclosure may be practiced without these specific details.

In some cases, in order to avoid obscuring the concept of the present disclosure, well-known structures and devices may be omitted, or may be illustrated in a block diagram form centering on core capabilities of each structure and device.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, UAV (Unmanned Aerial Vehicle, AR (Augmented Reality) device, VR (Virtual Reality) device and the like. Further, a 'terminal' may be fixed or mobile and may be replaced with terms including a mobile station (UE), a mobile station (MS), a user terminal (UT), a mobile subscriber station (MSS), a subscriber station (SS) Advanced Mobile Station (WT), a Wireless Terminal (WT), a Machine-Type Communication (MTC) device, a Machine-to-Machine (M2M) device, and a Device-to-Device (D2D) device, a vehicle, a robot, an AI module, UAV (Unmanned Aerial Vehicle, AR (Augmented Reality) device, VR (Virtual Reality) device and the like.

The following technology may be used in various wireless access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UNITS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document opened before the present disclosure may be referred to for a background art, terms, abbreviations, etc., used for describing the present disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification Hereinafter, preferred embodiments of the present disclosure will be described in detail with reference to the accompanying drawings. The detailed description, which will be given below with reference to the accompanying drawings, is intended to explain exemplary embodiments of the present disclosure and is not intended to represent the only embodiments in which the present disclosure may be practiced. The following detailed description includes specific details in order to provide a thorough understanding of the present disclosure. However, those skilled in the art appreciate that the present disclosure may be practiced without these specific details.

In some instances, well-known structures and devices may be omitted or shown in a block diagram form centering on the core functions of the structures and devices in order to avoid obscuring the concepts of the present disclosure.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

5G new radio (5G NR) defines enhanced mobile broadband (eMBB), massive machine type communications (mMTC), Ultra-Reliable and Low Latency Communications (URLLC), vehicle-to-everything (V2X) according to a usage scenario.

In addition, the 5G NR standard is classified into standalone (SA) and non-standalone (NSA) according to co-existence between the NR system and the LTE system.

In addition, the 5G NR supports various subcarrier spacings, and supports CP-OFDM in downlink and CP-OFDM and DFT-s-OFDM (SC-OFDM) in uplink.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

In addition, in the present disclosure, "A and/or B" may be interpreted as the same meaning as "including at least one of A or B".

5G Scenario

FIG. 1 illustrates an example of 5G scenario to which the present disclosure may be applied.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

<Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving (Autonomous-Driving)>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 2 illustrates an AI device 100 according to an embodiment of the disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 2, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 3 illustrates an AI server 200 according to an embodiment of the disclosure.

Referring to FIG. 3, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 4 illustrates an AI system 1 according to an embodiment of the disclosure.

Referring to FIG. 4, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 4 may be considered to be detailed embodiments of the AI device 100 shown in FIG. 1.

<AI+Robot>

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

<AI+Self-Driving>

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

<AI+XR>

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

<AI+Robot+Self-Driving>

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

<AI+Robot+Xr>

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Example of Communication System to which Present Disclosure is Applied

FIG. 5 illustrates a communication system 1 applied to the present disclosure.

Referring to FIG. 5, a communication system 1 applied to the present disclosure includes a wireless device, a base station, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 100a. vehicles 100b-1 and 100b-2, an eXtended Reality (XR) device 100c, a hand-held device 100d, a home appliance 100e, an Internet of Thing (IoT) device 100f, and an AI device/server 400. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the base station and the network may be implemented even the wireless device and a specific wireless device 200a may operate a base station/network node for another wireless device.

The wireless devices 100a to 100f may be connected to a network 300 through a base station 200. An artificial intelligence (AI) technology may be applied to the wireless devices 100a to 100f and the wireless devices 100a to 100f may be connected to an AI server 400 through the network 300. The network 300 may be configured by using a 3G network, a 4G (e.g., LTE) network, or a 5G (e.g., NR) network. The wireless devices 100a to 100f may communicate with each other through the BS 200/network 300, but may directly communicate with each other without going through the base station/network (e.g., sidelink communication). For example, the vehicles 100b-1 and 100b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 100a to 100f.

Wireless communications/connections 150a, 150b, and 150c may be made between the wireless devices 100a to 100f and the base station 200 and between the base station 200 and the base station 200. Here, the wireless communication/connection may be made through various wireless access technologies (e.g., 5G NR) such as uplink/downlink communication 150a, sidelink communication 150b (or D2D communication), and inter-base station communication 150c (e.g., relay, Integrated Access Backhaul (IAB)). The wireless device and the base station/the wireless device and the BS and the base station may transmit/receive radio signals to/from each other through wireless communications/connections 150a, 150b, and 150c. For example, the wireless communications/connections 150a, 150b, and 150c may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

FIG. 6 illustrates a wireless device applicable to the present disclosure.

Referring to FIG. 6, a first wireless device 6100 and a second wireless device 6200 may transmit/receive radio signals through various wireless access technologies (e.g., LTE and NR). Here, {the first wireless device 6100 and the second wireless device 6200} may correspond to {a wireless device 100x and a base station 200} and/or {a wireless device 100x and a wireless device 100x} of FIG. 5.

The first wireless device 6100 may include one or more processors 6102 and one or more memories 6104 and additionally further include one or more transceivers 6106 and/or one or more antennas 6108. The processor 6102 may control the memory 6104 and/or the transceiver 6106 and may be configured to implement descriptions, functions, procedures, proposals, methods, and/or operation flows disclosed in the present disclosure. For example, the processor 6102 may process information in the memory 6104 and generate a first information/signal and then transmit a radio signal including the first information/signal through the transceiver 6106. Furthermore, the processor 6102 may receive a radio signal including a second information/signal through the transceiver 6106 and then store in the memory 6104 information obtained from signal processing of the second information/signal. The memory 6104 may connected to the processor 6102 and store various information related to an operation of the processor 6102. For example, the memory 6104 may store a software code including instructions for performing some or all of processes controlled by the processor 6102 or performing the descriptions, functions, procedures, proposals, methods, and/or operation flowcharts disclosed in the present disclosure. Here, the processor 6102 and the memory 6104 may be a part of a communication modem/circuit/chip designated to implement the wireless communication technology (e.g., LTE and NR). The transceiver 6106 may be connected to the processor 6102 and may transmit and/or receive the radio signals through one or more antennas 6108. The transceiver 6106 may include a transmitter and/or a receiver. The transceiver 6106 may be interchangeably used with a radio frequency (RF) unit. In the present disclosure, the wireless device may mean the communication modem/circuit/chip.

The second wireless device 6200 may include one or more processors 6202 and one or more memories 6204 and additionally further include one or more transceivers 6206 and/or one or more antennas 6208. The processor 6202 may control the memory 6204 and/or the transceiver 6206 and may be configured to implement descriptions, functions, procedures, proposals, methods, and/or operation flows disclosed in the present disclosure. For example, the processor 6202 may process information in the memory 6204 and generate a third information/signal and then transmit a radio signal including the third information/signal through the transceiver 6206. Furthermore, the processor 6202 may receive a radio signal including a fourth information/signal through the transceiver 6206 and then store in the memory 6204 information obtained from signal processing of the fourth information/signal. The memory 6204 may connected to the processor 6202 and store various information related to an operation of the processor 6202. For example, the memory 6204 may store a software code including instructions for performing some or all of processes controlled by the processor 6202 or performing the descriptions, functions, procedures, proposals, methods, and/or operation flowcharts disclosed in the present disclosure. Here, the processor 6202 and the memory 6204 may be a part of a communication modem/circuit/chip designated to implement the wireless communication technology (e.g., LTE and NR). The transceiver 6206 may be connected to the processor 6202 and may transmit and/or receive the radio signals through one or more antennas 6208. The transceiver 6206 may include a transmitter and/or a receiver and the transceiver 6206 may be used interchangeably with the RF unit. In the present disclosure, the wireless device may mean the communication modem/circuit/chip.

Hereinafter, hardware elements of the wireless devices 6100 and 6200 will be described in more detail. Although not limited thereto, one or more protocol layers may be implemented by one or more processors 6102 and 6202. For example, one or more processors 6102 and 6202 may implement one or more layers (e.g., functional layers such as PHY, MAC, RLC, PDCP, RRC, and SDAP). One or more processors 6102 and 6202 may generate one or more protocol data units (PDUs) and/or one or more service data units (SDUs) according to the descriptions, functions, procedures, proposals, methods, and/or operation flowcharts disclosed in the present disclosure. One or more processors 6102 and 6202 may generate a message, control information, data, or information according to the descriptions, functions, procedures, proposals, methods, and/or operation flowcharts disclosed in the present disclosure. One or more processors 6102 and 6202 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 6106 and 6206. One or more processors 6102 and 6202 may receive the signal (e.g., baseband signal) from one or more transceivers 6106 and 6206 and acquire the PDU, the SDU, the message, the control information, the data, or the information according to the descriptions, functions, procedures, proposals, methods, and/or operation flowcharts disclosed in the present disclosure.

One or more processors 6102 and 6202 may be referred to as a controller, a microcontroller, a microprocessor, or a microcomputer. One or more processors 6102 and 6202 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 6102 and 6202. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 6102 and 6202 or stored in one or more memories 6104 and 6204 and driven by one or more processors 6102 and 6202. The descriptions, functions, procedures, proposals, and/or operation flowcharts disclosed in the present disclosure may be implemented by using firmware or software in the form of a code, the instruction and/or a set form of the instruction.

One or more memories 6104 and 6204 may be connected to one or more processors 6102 and 6202 and may store various types of data, signals, messages, information, programs, codes, instructions, and/or commands. One or more memories 6104 and 6204 may be configured by a ROM, a RAM, an EPROM, a flash memory, a hard drive, a register, a cache memory, a computer reading storage medium, and/or a combination thereof. One or more memories 6104 and 6204 may be positioned inside and/or outside one or more processors 6102 and 6202. Furthermore, one or more memories 6104 and 6204 may be connected to one or more processors 6102 and 6202 through various technologies such as wired or wireless connection.

One or more transceivers 6106 and 6206 may transmit to one or more other devices user data, control information, a wireless signal/channel, etc., mentioned in the methods and/or operation flowcharts of the present disclosure. One or more transceivers 6106 and 6206 may receive from one or more other devices user data, control information, a wireless signal/channel, etc., mentioned in the descriptions, functions, procedures, proposals, methods, and/or operation flowcharts disclosed in the present disclosure. For example, one or more transceivers 6106 and 6206 may be connected to one or more processors 6102 and 6202 and transmit and receive the radio signals. For example, one or more processors 6102 and 6202 may control one or more transceivers 6106 and 6206 to transmit the user data, the control information, or the radio signal to one or more other devices. Furthermore, one or more processors 6102 and 6202 may control one or more transceivers 6106 and 6206 to receive the user data, the control information, or the radio signal from one or more other devices. Furthermore, one or more transceivers 6106 and 6206 may be connected to one or more antennas 6108 and 6208 and one or more transceivers 6106 and 6206 may be configured to transmit and receive the user data, control information, wireless signal/channel, etc., mentioned in the descriptions, functions, procedures, proposals, methods, and/or operation flowcharts disclosed in the present disclosure through one or more antennas 6108 and 6280. In the present disclosure one or more antennas may be a plurality of physical antennas or a plurality of logical antennas (e.g., antenna ports). One or more transceivers 6106 and 6206 may convert the received radio signal/channel from an RF band signal to a baseband signal in order to process the received user data, control information, radio signal/channel, etc., by using one or more processors 6102 and 6202. One or more transceivers 6106 and 6206 may convert the user data, control information, radio signal/channel, etc., processed by using one or more processors 6102 and 6202, from the baseband signal into the RF band signal. To this end, one or more transceivers 6106 and 6206 may include an (analog) oscillator and/or filter.

Utilization Example of Wireless Device to which Present Disclosure is Applied

FIG. 7 illustrates another example of a wireless device applied to the present disclosure. The wireless device may be implemented as various types according to a use example/service (see FIG. 5).

Referring to FIG. 7, wireless devices 6100 and 6200 may correspond to the wireless devices 6100 and 6200 of FIG. 6 and may be constituted by various elements, components, units, and/or modules. For example, the wireless devices 6100 and 6200 may include a communication unit 6110, a control unit 6120, and a memory unit 6130, and an additional element 6140. The communication unit may include a communication circuit 6112 and a transceiver(s) 6114. For example, the communication circuit 112 may include one or more processors 6102 and 6202 and/or one or more memories 6104 and 6204 of FIG. 6. For example, the transceiver(s) 6114 may include one or more transceivers 6106 and 6206 and/or one or more antennas 6108 and 6208 of FIG. 6. The control unit 6120 is electrically connected to the communication unit 6110, the memory unit 6130, and the additional element 6140 and controls an overall operation of the wireless device. For example, the control unit 6120 may an electrical/mechanical operation of the wireless device based on a program/code/instruction/information stored in the memory unit 6130. Furthermore, the control unit 6120 may transmit the information stored in the memory unit 6130 to the outside (e.g., other communication devices) through the communication unit 6110 via a wireless/wired interface or store, in the memory unit 6130, information received from the outside (e.g., other communication devices) through the wireless/wired interface through the communication unit 6110.

The additional element 6140 may be variously configured according to the type of wireless device. For example, the additional element 6140 may include at least one of a power unit/battery, an input/output (I/O) unit, a driving unit, and a computing unit. Although not limited thereto, the wireless device may be implemented as a form such as the robot 100a of FIG. 5, the vehicles 100b-1 and 100b-2 of FIG. 5, the XR device 100c of FIG. 5, the portable device 100d of FIG. 5, the home appliance 100e of FIG. 5, the IoT device 100f of FIG. 5, a digital broadcasting terminal, a hologram device, a public safety device, an MTC device, a medical device, a Fintech device (or financial device), a security device, a climate/environment device, an AI server/device 400 of FIG. 5, the base station 200 of FIG. 5, a network node, etc. The wireless device may be movable or may be used at a fixed place according to a use example/service.

In FIG. 7, all of various elements, components, units, and/or modules in the wireless devices 6100 and 6200 may be interconnected through the wired interface or at least may be wirelessly connected through the communication unit 6110. For example, the control unit 6120 and the communication unit 6110 in the wireless devices 6100 and 6200 may be connected through wires and the control unit 6120 and the first unit (e.g., 6130 or 6140) may be wirelessly connected through the communication unit 6110. Further, each element, component, unit, and/or module in the wireless devices 6100 and 6200 may further include one or more elements. For example, the control unit 6120 may be constituted by one or more processor sets. For example, the control unit 6120 may be configured a set of a communication control processor, an application processor, an electronic control unit (ECU), a graphic processing processor, a memory control processor, etc. As another example, the memory 130 may be configured as a random access memory (RAM), a dynamic RAM (DRAM), a read only memory (ROM), a flash memory, a volatile memory, a non-volatile memory, and/or combinations thereof.

<LTE System in General>

FIG. 8 is a diagram showing an example of an LTE radio frame structure.

In FIG. 8, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

FIG. 9 is a diagram showing an example of a resource grid for a downlink slot.

In FIG. 9, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

FIG. 10 shows an example of a downlink subframe structure.

In FIG. 10, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 11 shows an example of an uplink subframe structure.

In FIG. 11, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, an LTE frame structure is described more specifically.

Throughout LTE specification, unless otherwise noted, the size of various fields in the time domain is expressed as a number of time units $T_s=1/(15000 \times 2048)$ seconds.

Downlink and uplink transmissions are organized into radio frames with $T_f=307200 \times T_s=10$ ms duration. Two radio frame structures are supported:

Type 1: applicable to FDD
Type 2: applicable to TDD

Frame Structure Type 1

FIG. 12 illustrates an example of frame structure type 1.

Frame structure type 1 is applicable to both full duplex and half duplex FDD. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Frame Structure Type 2

Frame structure type 2 is applicable to TDD. Each radio frame of length $T_f=307200 \times T_s=10$ ms consists of two half-frames of length $15360 \cdot T_s=0.5$ ms each. Each half-frame consists of five subframes of length $30720 \cdot T_s=1$ ms. The supported uplink-downlink configurations are listed in Table 2 where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by Table 1 subject to the total length of DwPTS, GP and UpPTS being equal to $30720 \cdot T_s=1$ ms. Each subframe i is defined as two slots, 2i and 2i+1 of length $T_{slot}=15360 \cdot T_s=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission. FIG. 13 is a diagram showing another example of a frame structure type 2.

Table 1 shows an example of the configuration of a special subframe.

TABLE 1

| Special subframe configuration | Normal cyclic prefix in downlink | | | Extended cyclic prefix in downlink | | |
|---|---|---|---|---|---|---|
| | DwPTS | UpPTS Normal cyclic prefix in uplink | Extended cyclic prefix in uplink | DwPTS | UpPTS Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 shows an example of an uplink-downlink configuration

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 14 illustrates a structure of a radio frame used in NR.

In NR, uplink and downlink transmission is configured by the frame. The radio frame has a length of 10 ms and is defined as two 5 ms half-frames (HFs). The half-frame is defined as 5 1 ms subframes (SFs). The subframe is split into one or more slits and the number of slots in the subframe depends on the subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbol may include an OFDM symbol (or CP-OFDM symbol) and an SC-FDMA symbol (or DFT-s-OFDM symbol).

Table 3 shows that when the normal CP is used, the number of symbols for each slot, the number of slots for each frame, and the number of slots for each subframe vary according to the SCS.

TABLE 3

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 3-continued

| SCS (15*2^u) | $N^{slot}_{symb}$ | $N^{frame,u}_{slot}$ | $N^{subframe,u}_{slot}$ |
|---|---|---|---|
| 120 KHz (u = 3) | 14 | 80 | 8 |
| 240 KHz (u = 4) | 14 | 160 | 16 |

* $N^{slot}_{symb}$: The number of symbols in slot
* $N^{frame,u}_{slot}$: The number of slots in frame
* $N^{subframe,u}_{slot}$: The number of slots in subframe Table 4 shows that when the extended CP is used, the number of symbols for each slot, the number of slots for each frame, and the number of slots for each subframe vary according to the SCS.

TABLE 4

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, OFDM(A) numerology (e.g., SCS, CP length, etc.) may be differently set between a plurality of cells merged into one UE. As a result, an (absolute time) section of the time resource (e.g., SF, slot or TTI) (for convenience, collectively referred to as Time Unit (TU)) constituted by the same number of symbols may be configured differently between the merged cells.

FIG. 15 illustrates a slot structure of an NR frame.

The slot includes a plurality of symbols in the time domain. For example, in the case of the normal CP, one slot includes 14 symbols, but in the case of the extended CP, one slot includes 12 symbols. A carrier includes a plurality of subcarriers in the frequency domain. The resource block (RB) is defined as a plurality of (e.g., 12) consecutive subcarriers in the frequency domain. A bandwidth part (BWP) may be defined as a plurality of consecutive (P)RBs in the frequency domain and may correspond to one numerology (e.g., SCS, CP length, etc.). The carrier may include a maximum of N (e.g., 5) BWPs. Data communication may be performed through an activated BWP, and only one BWP may be activated in one UE. In a resource grid, each element is referred to as a resource element (RE) and one complex symbol may be mapped.

FIG. 16 illustrates a structure of a self-contained slot.

In the NR system, a frame is characterized by a self-complete structure in which all of a DL control channel, DL or UL data, and UL control channel may be included in one slot. For example, first N symbols in the slot may be used to transmit a DL control channel (hereinafter, referred to as a DL control area), and last M symbols in the slot may be used to transmit a UL control channel (hereinafter, a UL control area). N and M are each an integer of 0 or more. A resource region (hereinafter, referred to as the data area) between the DL control area and the UL control area may be used for DL data transmission or UL data transmission. As an example, the following configuration may be considered. Each period is listed in chronological order.

1. DL only configuration
2. UL only configuration
3. Mixed UL-DL configuration
   DL area+Guard Period (GP)+UL control area
   DL control area+Guard Period (GP)+UL control area
   DL area: (i) DL data area, (ii) DL control area+DL data area
   UL area: (i) DL data area, (ii) DL data area+DL control area The PDCCH may be transmitted in the DL control area, and the PDSCH may be transmitted in the DL data area. The PUCCH may be transmitted in the UL control area, and the PUSCH may be transmitted in the UL data area. In the PDCCH, downlink control information (DCI), e.g., DL data scheduling information, UL data scheduling information, etc., may be transmitted. In PUCCH, uplink control information (UCI), e.g., Positive Acknowledgement/Negative Acknowledgement (ACK/NACK) information, Channel State Information (CSI) information, Scheduling Request (SR), etc., for DL data may be transmitted. The GP provides a time gap in the process of switching the BS and the UE from the transmission mode to the reception mode or the process of switching from the reception mode to the transmission mode. Some symbols at a switching timing from DL to UL may be configured as GP.

Machine Type Communication (MTC)

MTC as a type of data communication including one or more machines and may be applied to Machine-to-Machine (M2M) or Internet-of-Things (IoT). Here, the machine is an entity that does not require direct human manipulation or intervention. For example, the machine includes a smart meter with a mobile communication module, a vending machine, a portable terminal having an MTC function, etc.

In 3GPP, the MTC may be applied from release 10 and may be implemented to satisfy criteria of low cost and low complexity, enhanced coverage, and low power consumption. For example, a feature for a low-cost MTC device is added to 3GPP Release 12 and to this end, UE category 0 is defined. UE category is an index indicating how many data the UE may process in a communication modem. The UE of UE category 0 uses a half-duplex operation having a reduced peak data rate and relieved radio frequency (RF) requirements, and a single receiving antenna to reduce baseband/RF complexity. In 3GPP Release 12, enhanced MTC (eMTC) is introduced and the MTC terminal is configured to operate only at 1.08 MHz (i.e., 6 RBs) which is a minimum frequency bandwidth supported in legacy LTE to further reduce a price and power consumption of the MTC UE.

In the following description, the MTC may be interchangeably used with terms such as eMTC, LTE-M1/M2, Bandwidth reduced low complexity/coverage enhanced (BL/CE), non-BL UE (in enhanced coverage), NR MTC, enhanced BL/CE, etc., or other equivalent terms. Further, the MT CUE/device encompasses a UE/device (e.g., the smart meter, the vending machine, or the portable terminal with the MTC function) having the MTC function.

FIG. 17 illustrates MTC communication.

Referring to FIG. 17, the MTC device 100m as a wireless device providing the MTC may be fixed or mobile. For example, the MTC device 100m includes the smart meter with the mobile communication module, the vending machine, the portable terminal having the MTC function, etc. The base station 200m may be connected to the MTC device 100 by using radio access technology and connected to the MTC server 700 through a wired network. The MTC server 700 is connected to the MTC devices 100m and provides an MTC service to the MTC devices 100m. The service provided through the MTC has discrimination from a service in communication in which human intervenes in the related art and various categories of services including tracking, metering, payment, a medical field service, remote control, and the like may be provided. For example, services including electric meter reading, water level measurement, utilization of a monitoring camera, reporting of an inventory of the vending machine, and the like may be provided through the MTC. The MTC has a characteristic in that a transmission data amount is small and uplink/downlink data transmission/reception occurs occasionally. Accordingly, it is efficient to lower a unit price of the MTC device and reduce battery consumption according to a low data rate. The MTC device generally has low mobility, and as a result, the MTC has a characteristic in that a channel environment is hardly changed.

FIG. 18 illustrates physical channels used in MTC and general signal transmission using the same. In a wireless communication system, the MTC UE receives information from the BS through Downlink (DL) and the UE transmits information to the BS through Uplink (UL). The information which the base station and the UE transmit and receive includes data and various control information and there are various physical channels according to a type/use of the information which the base station and the UE transmit and receive.

A UE that is powered on again while being powered off or enters a new cell performs an initial cell search operation such as synchronizing with the BS (S1001). To this end, the UE receives a Primary Synchronization Signal (PSS) and a Secondary Synchronization Signal (SSS) from the BS to synchronize with the base station and obtain information such as a cell identifier (ID), etc. The PSS/SSS used for the initial cell search operation of the UE may be a PSS/SSS of the legacy LTE. Thereafter, the MTC UE may receive a Physical Broadcast Channel (PBCH) from the base station and obtain in-cell broadcast information (S1002). Meanwhile, the UE receives a Downlink Reference Signal (DL RS) in an initial cell search step to check a downlink channel state.

Upon completion of the initial cell search, the UE receives MTC PDCCH (MPDCCH) and PDSCH corresponding thereto to obtain more specific system information (S1102).

Thereafter, the UE may perform a random access procedure in order to complete an access to the base station (S1003 to S1006). Specifically, the UE may transmit a preamble through a Physical Random Access Channel (PRACH) (S1003) and receive a Random Access Response (RAR) for the preamble through the PDCCH and the PDSCH corresponding thereto (S1004). Thereafter, the UE may transmit a Physical Uplink Shared Channel (PUSCH) by using scheduling information in the RAR (S1005) and perform a Contention Resolution Procedure such as the PDCCH and the PDSCH corresponding thereto (S1006).

The UE that performs the aforementioned procedure may then perform reception of an MPDCCH signal and/or a PDSCH signal (S1107) and transmission of a physical uplink shared channel (PUSCH) signal and/or a physical uplink control channel (PUCCH) signal (S1108) as a general uplink/downlink signal transmission procedure. Control information transmitted from the UE to the BS is collectively referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a Channel Quality Indicator (CQI), a Precoding Matrix Indicator (PMI), Rank Indicator (RI), etc.

FIG. 19 illustrates cell coverage enhancement in MTC.

Various cell coverage extension techniques are being discussed in order to extend coverage extension or coverage enhancement (CE) of the base station for the MTC device 100m. For example, for the extension of the cell coverage, the base station/UE may transmit one physical channel/signal over multiple occasions (a bundle of physical channels). Within a bundle section, the physical channel/signal may be repeatedly transmitted according to a pre-defined rule. A receiving apparatus may increase a decoding success rate of the physical channel/signal by decoding a part or the entirety of the physical channel/signal bundle. Here, the occasion may mean a resource (e.g., time/frequency) in which the physical channel/signal may be transmitted/received. The occasion for the physical channel/signal may include a subframe, a slot, or a symbol set in a time domain. Here, the symbol set may be constituted by one or more consecutive OFDM-based symbols. The OFDM-based symbols may include an OFDM(A) symbol and a DFT-s-OFDM (A) (=SC-FDM(A)) symbol. The occasion for the physical channel/signal may include a frequency band and an RB set in a frequency domain. For example, PBCH, PRACH, MPDCCH, PDSCH, PUCCH, and PUSCH may be repeatedly transmitted.

FIG. 20 illustrates a signal band for MTC.

Referring to FIG. 20, as a method for lowering the unit price of the MTC UE, the MTC may operate only in a specific band (or channel band) (hereinafter, referred to as an MTC subband or narrowband (NB)) regardless of a system bandwidth of a cell. For example, an uplink/downlink operation of the MTC UE may be performed only in a frequency band of 1.08 MHz. 1.08 MHz corresponds to 6 consecutive physical resource blocks (PRBs) in the LTE system is defined to follow the same cell search and random access procedures as the LTE UE. FIG. 20(a) illustrates a case where an MTC subband is configured at a center (e.g., 6 PRBs) of the cell and FIG. 20(b) illustrates a case where a plurality of MTC subbands is configured in the cell. The plurality of MTC subbands may be consecutively/inconsecutively configured in the frequency domain. The physical channels/signals for the MTC may be transmitted/received in one MTC subband. In the NR system, the MTC subband may be defined by considering a frequency range and a subcarrier spacing (SCS). As an example, in the NR system, a size of the MTC subband may be defined as X consecutive PRBs (i.e., a bandwidth of $0.18*X*(2^u)$ MHz) (see Table 3 for u). Here, X may be defined as 20 according to the size of a Synchronization Signal/Physical Broadcast Channel (SS/PBCH). In the NR system, the MTC may operate in at least one bandwidth part (BWP). In this case, the plurality of MTC subbands may be configured in the BWP.

FIG. 21 illustrates scheduling in legacy LTE and MTC.

Referring to FIG. 21, in the legacy LTE, the PDSCH is scheduled by using the PDCCH. Specifically, the PDCCH may be transmitted in first N OFDM symbols in the subframe (N=1 to 3) and the PDSCH scheduled by the PDCCH is transmitted in the same subframe. Meanwhile, in the MTC, the PDSCH is scheduled by using the MPDCCH. As a result, the MTC UE may monitor an MPDCCH candidate in a search space in the subframe. Here, monitoring includes blind-decoding the MPDCCH candidates. The MPDCCH transmits the DCI and the DCI includes uplink or downlink scheduling information. The MPDCCH is FDM-multiplexed with the PDSCH in the subframe. The MPDCCH is repeatedly transmitted in a maximum of 256 subframes and the DCI transmitted by the MPDCCH includes information on the number of MPDCCH repetitions. In the case of downlink scheduling, when repeated transmission of the MPDCCH ends in subframe #N, the PDSCH scheduled by the MPDCCH starts to be transmitted in subframe #N+2. The PDSCH may be repeatedly transmitted in a maximum of 2048 subframes. The MPDCCH and the PDSCH may be transmitted in different MTC subbands. As a result, the MTC UE may perform radio frequency (RF) retuning for receiving the PDSCH after receiving the MPDCCH. In the case of uplink scheduling, when repeated transmission of the MPDCCH ends in subframe #N, the PUSCH scheduled by the MPDCCH starts to be transmitted in subframe #N+4. When the repeated transmission is applied to the physical channel, frequency hopping is supported between different MTC subbands by the RF retuning. For example, when the PDSCH is repeatedly transmitted in 32 subframes, the PDSCH may be transmitted in a first MTC subband in first 16 subframes and the PDSCH may be transmitted in a second MTC subband in 16 remaining subframes. The MTC operates in a half duplex mode. HARQ retransmission of the MTC is an adaptive asynchronous scheme.

Narrowband Internet of Things (NB-IoT)

NB-IoT represents a narrow-band Internet of Things technology that supports a low-power wide area network through a legacy wireless communication system (e.g., LTE, NR). In addition, the NB-IoT may refer to a system for supporting low complexity and low power consumption through a narrowband. The NB-IoT system uses OFDM parameters such as subcarrier spacing (SCS) in the same manner as the legacy system, so that there is no need to separately allocate an additional band for the NB-IoT system. For example, one PRB of the legacy system band may be allocated for the NB-IoT. Since the NB-IoT UE recognizes a single PRB as each carrier, the PRB and the carrier may be interpreted as the same meaning in the description of the NB-IoT.

Hereinafter, the description of the NB-IoT mainly focuses on a case where the description of the NB-IoT is applied to the legacy LTE system, but the description below may be extensively applied even to a next generation system (e.g., NR system, etc.). Further, in the present disclosure, contents related to the NB-IoT may be extensively applied to MTC which aims for similar technical purposes (e.g., low-power, low-cost, coverage enhancement, etc.). Further, the NB-IoT may be replaced with other equivalent terms such as NB-LTE, NB-IoT enhancement, enhanced NB-IoT, further enhanced NB-IoT, NB-NR, and the like.

FIG. 22 illustrates physical channels used in NB-IoT and general signal transmission using the same. In the wireless communication system, the UE receives information from the base station through Downlink (DL) and the UE transmits information to the base station through Uplink (UL). The information which the base station and the UE transmit and receive includes data and various control information and there are various physical channels according to a type/use of the information which the base station and the UE transmit and receive.

A UE that is powered on again while being powered off or enters a new cell performs an initial cell search operation such as synchronizing with the base station (S11). To this end, the UE receives a Narrowband Primary Synchronization Signal (NPSS) and a Narrowband Secondary Synchronization Signal (NSSS) from the base station to synchronize with the BS and obtain information such as a cell identifier (ID), etc. Thereafter, the UE receives a Narrowband Physical Broadcast Channel (NPBCH) from the base station to obtain in-cell broadcast information (S12). Meanwhile, the UE receives a Downlink Reference Signal (DL RS) in an initial cell search step to check a downlink channel state.

Upon completion of the initial cell search, the UE receives Narrowband PDCCH (NPDCCH) and Narrowband PDSCH (NPDSCH) corresponding thereto to obtain more specific system information in step S12 (S12).

Thereafter, the UE may perform a random access procedure in order to complete an access to the BS (S13 to S16). Specifically, the UE may transmit a preamble through a Narrowband Physical Random Access Channel (NPRACH) (S13) and receive the Random Access Response (RAR) for the preamble through the NPDCCH and the NPDSCH corresponding thereto (S14). Thereafter, the UE may transmit a Narrowband Physical Uplink Shared Channel (NPUSCH) by using scheduling information in the RAR (S15) and perform a Contention Resolution Procedure such as the NPDCCH and the NPDSCH corresponding thereto (S16).

The UE that performs the aforementioned procedure may then perform reception of the NPDCCH signal and/or NPDSCH signal (S17) and NPUSCH transmission (S18) as the general uplink/downlink signal transmission procedure. Control information transmitted from the UE to the BS is collectively referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a Channel Quality Indicator (CQI), a Precoding Matrix Indicator (PMI), Rank Indicator (RI), etc. In the NB-IoT, the UCI is transmitted through the NPUSCH. According to the request/instruction of the network (e.g., base station), the UE may transmit the UCI through the NPUSCH periodically, aperiodically, or semi-persistently.

An NB-IoT frame structure may be configured differently according to the subcarrier spacing (SCS). FIG. 23 illustrates a frame structure when a subframe spacing is 15 kHz and FIG. 24 illustrates a frame structure when a subframe spacing is 3.75 kHz. The frame structure of FIG. 23 may be used in downlink/uplink and the frame structure of FIG. 24 may be used only in uplink.

Referring to FIG. 23 the NB-IoT frame structure for the subcarrier spacing of 15 kHz may be configured to be the same as the frame structure of the legacy system (i.e., LTE system). That is, a 10-ms NB-IoT frame may include ten 1-ms NB-IoT subframes and a 1-ms NB-IoT subframe may include two 0.5-ms NB-IoT slots. Each 0.5-ms NB-IoT slot may include seven symbols. The 15-kHz subcarrier spacing may be applied to both downlink and uplink. The symbol includes an OFDMA symbol in downlink and an SC-FDMA symbol in uplink. In the frame structure of FIG. 23, the system band is 1.08 MHz and is defined by 12 subcarriers. The 15-kHz subcarrier spacing is applied to both downlink and uplink and orthogonality with the LTE system is guaranteed, and as a result, coexistence with the LTE system may be facilitated.

Meanwhile, referring to FIG. 24, when the subcarrier spacing is 3.75 kHz, the 10-ms NB-IoT frame may include five 2-ms NB-IoT subframes, and the 2-ms NB-IoT subframe may include seven symbols and one guard period (GP) symbol. The 2-ms NB-IoT subframe may be expressed as an NB-IoT slot or an NB-IoT resource unit (RU). Here, the symbol may include the SC-FDMA symbol. In the frame structure of FIG. 25, the system band is 1.08 MHz and is defined by 48 subcarriers. The subcarrier spacing of 3.75 kHz may be applied only to the uplink and the orthogonality with the LTE system may be impaired, resulting in performance degradation due to interference.

The figure may illustrate an NB-IoT frame structure based on an LTE system frame structure and the illustrated NB-IoT frame structure may be extensively applied even to the next-generation system (e.g., NR system). For example, in the frame structure of FIG. 23, the subframe interval may be replaced with the subframe interval of Table 3.

FIG. 25 illustrates three operation modes of NB-IoT. Specifically, FIG. 25(a) illustrates an in-band system, FIG. 25(b) illustrates a guard-band system, and FIG. 25(c) illustrates a stand-alone system. Here, the in-band system may be expressed as an in-band mode, the guard-band system may be expressed as guard-band mode, and the stand-alone system may be expressed as a stand-alone mode. For convenience, the NB-IoT operation mode is described based on the LTE band, but the LTE band may be replaced with a band of another system (e.g., NR system band).

The in-band mode means an operation mode to perform the NB-IoT in the (legacy) LTE band. In the in-band mode, some resource blocks of an LTE system carrier may be allocated for the NB-IoT. For example, in the in-band mode, specific 1 RB (i.e., PRB) in the LTE band may be allocated for the NB-IoT. The in-band mode may be operated in a structure in which the NB-IoT coexists in the LTE band. The guard-band mode means an operation mode to perform the NB-IoT in a reserved space for the guard-band of the (legacy) LTE band. Accordingly, in the guard-band mode, the guard-band o the LTE carrier not used as the resource block in the LTE system may be allocated for the NB-IoT. The (legacy) LTE band may have a guard-band of at least 100 kHz at the end of each LTE band. The stand-alone mode means an operation mode to perform the NB-IoT in a frequency band independently from the (legacy) LTE band. For example, in the stand-alone mode, a frequency band (e.g., a GSM carrier to be reallocated in the future) used in a GSM EDGE Radio Access Network (GERAN) may be allocated for the NB-IoT.

The NB-IoT UE searches an anchor carrier in units of 100 kHz and in the in-band and the guard-band, a center frequency of the anchor carrier should be located within ±7.5 kHz from a 100 kHz channel raster. Further, six center PRBs among LTE PRBs are not allocated to the NB-IoT. Accordingly, the anchor carrier may be located only in a specific PRB.

FIG. 26 illustrates a layout of an in-band anchor carrier at an LTE bandwidth of 10 MHz.

Referring to FIG. 26, a direct current (DC) subcarrier is located in the channel raster. Since a center frequency spacing between adjacent PRBs is 180 kHz, the center frequency is located at ±2.5 kH from the channel raster in the case of PRB indexes 4, 9, 14, 19, 30, 35, 40, and 45. Similarly, the center frequency of the PRB suitable as the anchor carrier at an LTE bandwidth of 20 MHz is located at ±2.5 kHz from the channel raster and the center frequency of the PRB suitable as the anchor carrier at LTE bandwidths of 3 MHz, 5 MHz, and 15 MHz is located at ±7.5 kHz from the channel raster.

In the case of the guard-band mode, the center frequency is located at ±2.5 kHz from the channel raster in the case of a PRB immediately adjacent to an edge PRB of LTE at the bandwidths of 10 MHz and 20 MHz. In the case of the bandwidths 3 MHz, 5 MHz, and 15 MHz, a guard frequency band corresponding to three subcarriers from the edge PRB is used to locate the center frequency of the anchor carrier at ±7.5 kHz from the channel raster.

The anchor carrier of the stand-alone mode may be aligned in the 100 kHz channel raster and all GSM carriers including a DC carrier may be used as the NB-IoT anchor carrier.

The NB-IoT may support multi-carriers and combinations of in-band and in-band, in-band and guard-band, guard band and guard-band, and stand-alone and stand-alone may be used.

In NB-IoT downlink, physical channels such as a Narrowband Physical Broadcast Channel (NPBCH), a Narrowband Physical Downlink Shared Channel (NPDSCH), and a Narrowband Physical Downlink Control Channel (NPDCCH) are provided and physical signals such as a Narrowband Primary Synchronization Signal (NPSS), a Narrowband Primary Synchronization Signal (NSSS), and a Narrowband Reference Signal (NRS) are provided.

The NPBCH transfers, to the UE, a Master Information Block-Narrowband (MIB-NB) which is minimum system information which the NB-IoT requires for accessing the system. The NPBCH signal may be repeatedly transmitted eight times in total for coverage enhancement. A Transport Block Size (TBS) of the MIB-NB is 34 bits and is newly updated every 64 ms TTI period. The MIB-NB includes information such as an operation mode, a System Frame Number (SFN), a Hyper-SFN, the number of Cell-specific Reference Signal (CRS) ports, a channel raster offset, etc.

NPSS is configured by a Zadoff-Chu (ZC) sequence with a sequence length of 11 and a root index of 5. The NPSS may be generated according to the following equation.

$$d_l(n) = S(l) \cdot e^{-j\frac{\pi un(n+1)}{11}}, n = 0, 1, \ldots, 10 \quad \text{[Equation 1]}$$

Here, S(1) for OFDM symbol index 1 may be defined as in Table 5.

TABLE 5

| Cyclic prefix length | S(3) ... S(13) |
|---|---|
| Normal | 1  1  1  1  −1  −1  1  1  1  −1  1 |

NSSS is constituted by a combination of a ZC sequence with a sequence length of 131 and a binary scrambling sequence such as a Hadamard sequence. The NSSS indicates PCID to NB-IoT UEs in the cell through the combination of the sequences.

The NSSS may be generated according to the following equation.

$$d(n) = b_q(m)e^{-j2\pi\theta_f n}e^{\frac{\pi i n'(n'+1)}{131}} \quad \text{[Equation 2]}$$

Here, variables applied to Equation 2 may be defined as follows.

$$n = 0, 1, \ldots, 131 \quad \text{[Equation 2]}$$
$$n' = n \bmod 131$$
$$m = n \bmod 128$$
$$u = N_{ID}^{Ncell} \bmod 126 + 3$$
$$q = \left\lfloor \frac{N_{ID}^{Ncell}}{126} \right\rfloor$$

Here, the binary sequence $b_q(m)$ is defined as in Table 6, and $b_0(m)$ to $b_3(m)$ correspond to columns 1, 32, 64, and 128 of the 128-th Hadamard matrix, respectively. The cyclic shift $\theta_f$ for the frame number of may be defined as in Equation 4.

TABLE 6

| q | $b_q(0) \ldots b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1 1 −1 −1 1 1 −1 −1 1 −1 1 1 1 −1 −1 1 1 −1 1 1 −1 −1 1 −1 1 1 −1 −1 1 1 −1 1 1 −1 −1 1 −1 1 1 −1 1 −1 −1 1 −1 1 1 1 −1 1 1 1 −1 −1 1 1 −1 1 −1 −1 1 −1 1 1 1 −1 1 1 1 −1 −1 1 1 −1 1 −1 −1 1 −1 1 1 1 −1 −1 1 −1 1 1 1 −1 −1 1 −1 1 1 −1 1 −1 −1 1 −1 1 1 1 −1 1 1 −1] |
| 2 | [1 −1 −1 1 −1 1 1 1 −1 −1 1 1 1 −1 −1 1 −1 1 1 1 −1 −1 1 −1 1 1 −1 −1 1 −1 1 1 −1 −1 1 −1 1 1 −1 1 1 −1 −1 1 −1 −1 1 1 −1 1 1 −1 −1 1 −1 −1 1 1 −1 1 1 −1 1 1 −1 1 −1 −1 1 1 −1 1 1 −1 −1 1 −1 1 1 −1 1 −1 −1 1 1 −1 1 1 −1 1 −1 −1 1 −1 1 1 1 −1 1 1 1 −1 −1 1 1 −1 1 −1 −1 1 −1 1 1 1 −1 1 1 1 −1 −1 1 −1 1 1 −1 1 −1 1 1 −1 1 1] |
| 3 | [1 −1 −1 1 −1 1 1 1 −1 −1 1 1 1 −1 −1 1 −1 1 1 1 −1 −1 1 −1 1 1 −1 −1 1 −1 1 1 −1 −1 1 −1 1 1 −1 1 1 −1 −1 1 −1 −1 1 1 −1 1 1 −1 −1 1 −1 −1 1 1 −1 1 1 −1 1 1 −1 1 −1 −1 1 1 −1 1 1 −1 −1 1 −1 1 1 −1 1 −1 −1 1 1 1 −1 1 1 −1 −1 −1 1 −1 1 1 1 −1 1 1 −1 −1 1 −1 1 1 1 −1 −1 1 −1 1 1 −1 1 −1 −1 1 −1 1 1 1 −1 −1 1 1 1 −1] |

$$\theta_f \frac{33}{132}(n_f/2) \bmod 4 \qquad \text{[Equation 4]}$$

Here, of represents a radio frame number. mod represents a modulo function.

A downlink physical channel/signal includes NPSS, NSSS, NPBCH, NRS, NPDCCH, and NPDSCH.

FIG. 27 illustrates transmission of an NB-IoT downlink physical channel/signal in an FDD LTE system. The downlink physical channel/signal is transmitted through one PRB and supports 15 kHz subcarrier spacing/multi-tone transmission.

Referring to FIG. 27, the NPSS is transmitted in a 6$^{th}$ subframe of every frame and the NSSS is transmitted in a last (e.g., 10$^{th}$) subframe of every even frame. The UE may obtain frequency, symbol, and frame synchronization using the synchronization signals (NPSS and NSSS) and search 504 physical cell IDs (PCIDs) (i.e., base station IDs). The NPBCH is transmitted in a first subframe of every frame and transports the NB-MIB. The NRS is provided as a reference signal for downlink physical channel demodulation and is generated in the same scheme as the LTE. However, Physical Cell ID (NB-PCID) (or NCell ID or NB-IoT base station ID) is used as an initialization value for NRS sequence generation. The NRS is transmitted through one or two antenna ports. The NPDCCH and the NPDSCH may be transmitted in the remaining subframes except for the NPSS/NSSS/NPBCH. The NPDCCH and the NPDSCH may be transmitted together in the same subframe. The NPDCCH transports the DCI and the DCI supports three types of DCI formats. DCI format N0 includes Narrowband Physical Uplink Shared Channel (NPUSCH) scheduling information and DCI formats N1 and N2 include NPDSCH scheduling information. The NPDCCH may be repeatedly transmitted 2048 times in total for coverage enhancement. The NPDSCH is used for transmitting data (e.g., TB) of transmission channels such as a Downlink-Shared Channel (DL-SCH) and a Paging Channel (PCH). The maximum TBS is 680 bits and may be repeatedly transmitted 2048 times in total for coverage enhancement.

The uplink physical channel includes a Narrowband Physical Random Access Channel (NPRACH) and the NPUSCH and supports single-tone transmission and multi-tone transmission. The single-tone transmission is supported for the subcarrier spacings of 3.5 kHz and 15 kHz and the multi-tone transmission is supported only for the subcarrier spacing of 15 kHz.

FIG. 28 illustrates an NPUSCH format.

The NPUSCH supports two formats. NPUSCH format 1 is used for UL-SCH transmission, and the maximum TBS is 1000 bits. NPUSCH format 2 is used for transmission of uplink control information such as HARQ ACK signaling. NPUSCH format 1 supports the single-/multi-tone transmission, and NPUSCH format 2 supports only the single-tone transmission. In the case of the single-tone transmission, pi/2-Binary Phase Shift Keying (BPSK) and pi/4-Quadrature Phase Shift Keying (QPSK) are used to reduce Peat-to-Average Power Ratio (PAPR). In the NPUSCH, the number of slots occupied by one resource unit (RU) may vary according to resource allocation. The RU represents the smallest resource unit to which the TB is mapped, and is constituted by NULsymb*NULslots consecutive SC-FDMA symbols in the time domain and NRUsc consecutive subcarriers in the frequency domain. Here, NULsymb represents the number of SC-FDMA symbols in the slot, NULslots represents the number of slots, and NRUsc represents the number of subcarriers constituting the RU.

Table 7 shows the configuration of the RU according to the NPUSCH format and subcarrier spacing. In the case of TDD, the supported NPUSCH format and SCS vary according to the uplink-downlink configuration. Table 2 may be referred to for the uplink-downlink configuration.

TABLE 7

| NPUSCH format | Subcarrier spacing | Supported uplink-downlink configurations | $N^{RU}_{sc}$ | $N^{UL}_{slots}$ | $UL_{symb}$ |
|---|---|---|---|---|---|
| 1 | 3.75 kHz | 1, 4 | 1 | 16 | |
|  | 15 kHz | 1, 2, 3, 4, 5 | 1 | 16 | |
|  |  |  | 3 | 8 | |
|  |  |  | 6 | 4 | |
|  |  |  | 12 | 2 | |
| 2 | 3.75 kHz | 1, 4 | 1 | 4 | |
|  | 15 kHz | 1, 2, 3, 4, 5 | 1 | 4 | |

Scheduling information for transmission of UL-SCH data (e.g., UL-SCH TB) is included in DCI format N0, and the DCI format N0 is transmitted through the NPDCCH. The DCI format N0 includes information on the start time of the NPUSCH, the number of repetitions, the number of RUs used for TB transmission, the number of subcarriers, resource locations in the frequency domain, and MCS.

Referring to FIG. 28, DMRSs are transmitted in one or three SC-FDMA symbols per slot according to the NPUSCH format. The DMRS is multiplexed with data (e.g., TB, UCI), and is transmitted only in the RU including data transmission.

FIG. 29 illustrates an operation when multi-carriers are configured in FDD NB-IoT.

In FDD NB-IoT, a DL/UL anchor-carrier may be basically configured, and a DL (and UL) non-anchor carrier may be additionally configured. Information on the non-anchor carrier may be included in RRCConnectionReconfiguration. When the DL non-anchor carrier is configured (DL add carrier), the UE receives data only in the DL non-anchor carrier. On the other hand, synchronization signals (NPSS and NSSS), broadcast signals (MIB and SIB), and paging signals are provided only in the anchor-carrier. When the DL non-anchor carrier is configured, the UE listens only to the DL non-anchor carrier while in the RRC_CONNECTED state. Similarly, when the UL non-anchor carrier is configured (UL add carrier), the UE transmits data only in the UL non-anchor carrier, and simultaneous transmission on the UL non-anchor carrier and the UL anchor-carrier is not allowed. When the UE is transitioned to the RRC_IDLE state, the UE returns to the anchor-carrier.

FIG. 29 illustrates a case where only the anchor-carrier is configured for UE1, the DL/UL non-anchor carrier is additionally configured for UE2, and the DL non-anchor carrier is additionally configured for UE3. As a result, carriers in which data is transmitted/received in each UE are as follows.

UE1: Data reception (DL anchor-carrier) and data transmission (UL anchor-carrier)
UE2: Data reception (DL non-anchor-carrier) and data transmission (UL non-anchor-carrier)
UE3: Data reception (DL non-anchor-carrier) and data transmission (UL anchor-carrier)

The NB-IoT UE may not transmit and receive at the same time, and the transmission/reception operations are limited to one band each. Therefore, even if the multi-carrier is configured, the UE requires only one transmission/reception chain of the 180 kHz band.

The aforementioned contents (the NR frame structure, etc.) may be applied by being combined with methods proposed in the present disclosure to be described or may be complementally applied in order to clarify technical characteristics of the methods proposed in the present disclosure.

Furthermore, methods to be described later and related to a preconfigured uplink resource (PUR) are related to uplink transmission and may be identically applied to the aforementioned uplink signal transmission method. In addition, a technical spirit proposed in the present disclosure may be modified in order to be suitable for a term, an expression, a structure, etc. defined in each system so that it can be also implemented in the aforementioned wireless communication system or may replace a term, an expression, a structure, etc. defined in each system.

Uplink transmission through a preconfigured uplink resource may be performed in the following sequence.
1) A UE receives, from a base station, PUR configuration information for uplink transmission through a PUR, through higher layer signaling, in a radio resource control (RRC) connected mode.
2) After receiving the PUR configuration information, the UE transits from an RRC connected state to a specific state for uplink transmission through a PUR. The specific state may be an RRC idle state or an RRC inactive state.
3) Thereafter, the UE transmits an uplink signal to the base station based on the PUR configuration information in the specific state.

The PUR configuration information for the uplink transmission through a PUR may include the following information.

Time domain resource(s) including periodicity
Frequency domain resource(s)
A transport block size (TBS)(s)/modulation coding scheme (MCS)(s)
A search space for feedback monitoring in response to UL transmission in PUR)

If uplink transmission through a PUR is solely performed, the time domain resource may be information on a start point and duration (duration of a resource for uplink transmission through a PUR). Furthermore, if uplink transmission through a PUR is periodically performed, the time domain resource may further include period information on the start point and the duration.

Furthermore, the frequency domain resource may be resource assignment information on a frequency using at least one of pieces of information, such as a narrowband (NB) index, a resource block (RB) or a subcarrier index. Furthermore, if frequency hopping is supported, the frequency domain resource may further information related to frequency hopping. In this case, the information related to frequency hopping may have a form of a $1^{st}$ frequency hop and a $2^{nd}$ frequency hop or a form of a $1^{st}$ frequency hop and a frequency gap.

Furthermore, the configuration information may include information for defining an MPDCCH search space (SS) monitored for a HARQ operation, a PUR configuration update and/or DCI reception for downlink scheduling or for defining duration in which monitoring for the search space is performed after a UE performs uplink transmission through a PUR. The information for defining the search space or the duration in which a search space is monitoring may be called search space (SS) information.

The search space information may be configured in a form similar to that of PUR configuration information. That is, the search space information may include parameters for determining a start point, duration, a period, etc. The start point may have a subframe form corresponding to an offset. The duration may be determined by MPDCCH maximum repetition recovery (Rmax). Furthermore, the period may be determined in a form in which Rmax is multiplied by a scaling factor.

In the present disclosure, a preconfigured uplink resource (PUR) means an uplink transmission resource pre-configured from a base station through higher layer signaling in an RRC connected state in order for a user equipment (UE) to perform uplink transmission without an UL grant in an RRC idle state. That is, the PUR may be interpreted as including an operation and procedure for performing UL transmission based on an assigned UL resource by a UE in an RRC connected state to which an UL transmission resource is previously assigned and which transits to an RRC idle state for uplink transmission through a PUR in the RRC connected state.

In the present disclosure, an operation of transmitting, by a UE, an uplink signal by using a PUR (or a PUR resource) may be simply expressed as 'PUR transmission'. Furthermore, in the present disclosure, a search space (SS) for monitoring, by a UE, information, UL grant downlink control information (DCI), DL assignment DCI, etc. related to downlink feedback after PUR transmission is called a PUR SS.

In this case, the information related to downlink feedback may include information for a hybrid automatic repeat request (HARQ) operation. Furthermore, UL grant DCI may be control information for scheduling a resource for uplink transmission by a UE, and DL assignment DCI may be control information for the scheduling of a resource for downlink transmission by a base station.

A PUR resource and a PUR SS resource may be independently configured. That is, a PUR resource and a PUR SS resource may be configured to have different periods and start points.

Furthermore, in the present disclosure, in the case of a UE in an RRC idle state, the UE may be interpreted as performing PUR transmission when a timing advance (TA) is valid. The timing advance may mean a parameter related to uplink transmission timing of a UE.

A PUR may be periodically configured through configuration parameters, such as a start point, a period, and transmission duration.

That is, a UE may perform PUR transmission on a periodically assigned PUR resource based on the configuration parameters.

For example, when a PUR is periodically configured in a UE, each of the PUR resources configured in the UE may be indicated as { ... , PUR #n, PUR #n+1, ... }, respectively. In this case, a PUR occasion (e.g., PUR #k) capable of UL transmission may be present for each PUR resource every period, and the UE may perform PUR transmission in a PUR occasion. One or more PUR occasions may be present in one PUR resource.

The PUR occasion may mean a time/frequency resource assignment unit capable of uplink transmission through a PUR. More specifically, the PUR occasion may be a subframe unit, a slot unit, an OFDM symbol unit, etc. in a time domain and may be an RB unit, a subcarrier unit or an NB unit in a frequency domain.

FIG. 30 is a diagram illustrating an example of a method of configuring a PUR resource in a UE.

A UE may be assigned a PUR 3000 by receiving PUR configuration information including configuration parameters for PUR transmission from a base station (3010). The PUR 3000 may include at least one PUR resource 3030 to 3050. In this case, the at least one PUR resource each may be assigned for each given period (T) and may be indicated as a PUR #1, a PUR #2, respectively. Furthermore, the UE may perform PUR transmission in one or more PUR occasions in each of the at least one PUR resource. The UE may repeatedly perform PUR transmission based on a parameter for a repetition transmission number included in the PUR configuration information. If PUR transmission is repeatedly performed, the PUR occasion may be given as time duration having a given length in which PUR repetition transmission may be performed.

During the PUR transmission of the UE, a PUR configuration parameter(s) configured in the UE may be updated by the necessity of a communication environment or a base station/network. Hereinafter, an operation of updating a PUR configuration parameter(s) configured in a UE may be simply called a 'PUR configuration update', a 'PUR configuration parameter update', etc., and may be called various expressions within a range which may be interpreted as the same meaning therewith.

The update of the PUR configuration parameter(s) may be performed through layer 1 (L1) signaling. Alternatively, the update of the PUR configuration parameter(s) may be performed through a medium access control element (MAC CE) or radio resource control (RRC) signaling. An update through L1 signaling may mean an update through DCI. The PUR configuration parameter(s) may mean a parameter(s) related to a PUR configuration for a PUR operation of a UE. Hereinafter, a PUR configuration parameter(s) may be called a 'parameter(s) related to a PUR configuration', a PUR parameter(s), etc., and may be variously expressed within a range which may be interpreted as the same meaning therewith.

FIG. 31 is a diagram illustrating an example of an operation of updating a PUR configuration of a UE.

A UE may be assigned a PUR 3100 by receiving PUR configuration information including configuration parameters for PUR transmission from a base station (3110). The PUR 3100 may include at least one PUR resource 3130 to 3180. In this case, each of the at least one PUR resource may be assigned every given period (T1 or T2), and may be indicated as a PUR #1, a PUR #2. Furthermore, the UE may perform PUR transmission one or more PUR occasions in each of the at least one PUR resource.

If a PUR configuration parameter(s) configured based on the PUR configuration information 3110 needs to be updated by the necessity of a communication environment or a base station/network, the UE may receive L1 signaling, a MAC CE or RRC signaling indicating the update of PUR configuration parameters based on the PUR configuration information 3110 (3120).

The PUR configuration parameters may be updated based on signaling indicating the update of the PUR configuration parameters. The UE may perform PUR transmission based on the updated PUR configuration parameters. The PUR resources 3160 to 3180 to which the updated PUR configuration parameters have been applied may be assigned to the UE in a given period of T2. The UE may perform PUR transmission in each of the PUR resources 3160 to 3180 to which the updated PUR configuration parameters have been applied.

PUR transmission may be repeatedly performed even in the PUR resources 3130 to 3180 included in the PUR 3100 as in the example of FIG. 30.

The present disclosure relates to an uplink transmission method through a preconfigured uplink resource (PUR) and an apparatus therefor. In particular, a method provided in the present disclosure relates to an operation of updating a PUR configuration parameter based on the aforementioned L1 signaling, etc. and reliability improvement when the operation is performed.

Hereinafter, a serving cell may mean a cell that has configured a PUR and/or a cell that receives UL transmission through a PUR. Furthermore, a 'PUR' may be a meaning including both a dedicated PUR configured in only a specific UE without contention between UEs and a shared PUR identically configured in multiple UEs and shared between the multiple UEs. Alternatively, a 'PUR' may mean only a shared PUR. Alternatively, a 'PUR' may mean a dedicated PUR.

Furthermore, hereinafter, a 'PDCCH' means a common physical control channel, and may be used as a meaning including an MPDCCH, an NPDCCH, etc. Furthermore, a 'physical downlink shared channel (PDSCH)' means a common physical downlink shared channel, and may be used as a meaning including an NPDSCH. Furthermore, a 'physical uplink shared channel (PUSCH) means a common physical uplink shared channel, and may be used as a meaning including an NPUSCH. For a related more detailed description, reference may be made to the aforementioned description of MTC, NB-IoT.

Hereinafter, for convenience of description, a PUR SS corresponding to PUR transmission in a PUR resource #n is indicated as a PUR SS #n. That is, a PUR SS corresponding to PUR transmission in a current PUR resource (PUR #n) may be indicated as a PUR SS #n. A next PUR resource of the PUR #n may be indicated as a PUR #n+1. A PUR SS corresponding to PUR transmission in the PUR n+1 may be indicated as a PUR SS #n+1. Furthermore, in the present disclosure, a 'PUR resource' may be expressed as a 'resource of a PUR', a 'first resource of a PUR', a 'first resource', etc. In addition, a 'PUR resource' may be used as another expression identically interpreted with a corresponding meaning.

PUR Configuration Update Method Based on L1 Signaling—(Method 1)

The present method relates to a method of reliably updating a PUR configuration parameter(s) through L1 signaling.

Hereinafter, a method (operation) of updating a PUR configuration parameter(s) configured in a UE through L1 signaling is simply called like an 'L1 PUR configuration update'.

Information related to the update of a PUR configuration parameter(s) for an L1 PUR configuration update may be transmitted through a PUR SS monitored after given duration (a given time offset) after a UE performs PUR transmission (or after transmission completion timing).

An L1 PUR configuration update method has an advantage in that a parameter update can be rapidly performed compared to the aforementioned parameter update method through MAC CE or RRC signaling. In contrast, there is a disadvantage in that it cannot be guaranteed that L1 signaling can be delivered to a UE with a 100% probability. Furthermore, there is no method for a base station to identify whether L1 signaling has been successfully delivered to a UE. Accordingly, there is a disadvantage in that a base station cannot take subsequent measures for reliability improvement of L1 signaling after L1 signaling transmission.

The present method proposes the following methods in order to improve reliability when performing an L1 PUR configuration update in order to supplement the disadvantage of L1 signaling.

Before methods provided in the present method are described in detail, a common procedure of performing, by a UE, the update of a configured PUR configuration parameter(s) is first described below.

1) First, a UE receives, from a base station, PUR configuration information for uplink transmission through a PUR, through higher layer signaling in an RRC connected state. The through higher layer signaling may be RRC signaling.

In this case, the PUR configuration information transmitted through higher layer signaling may be a PUR-config information element (IE), and may include the following parameters.

implicitReleaseAfter: it may be a value of a consecutive empty PUR occasion (that is, a PUR occasion in which PUR transmission is not performed) prior to implicit release. Value e2 corresponds to a case of two PURs, and value e4 corresponds to a case of four PURs. When an implicitReleaseAfter parameter is not configured, implicit PUR release based on consecutive empty PUR occasions is not applied (Number of consecutive empty PUR occasions before implicit release, Value e2 corresponds to 2 PUR occasions, value e4 corresponds to 4 PUR occasions and so on. If implicitReleaseAfter is not configured, implicit PUR release based on consecutive empty PUR occasions is not applicable.).

pucch-NumRepetitionCE-Format1: When pur-GrantInfo is configured as ce-ModeA, value n1 may correspond to one repetition, and value n2 may correspond to two repetitions. Furthermore, if pur-GrantInfo is configured as ce-ModeB, an actual value corresponds to four times an indicated value (When pur-GrantInfo is set to ce-ModeA, value n1 corresponds to 1 repetition, value n2 corresponds to 2 repetitions, and so on. When pur-GrantInfo is set to ce-ModeB, actual value corresponds to 4*indicated value.).

pur-GrantInfo: this indicates an UL grant for uplink transmission through a PUR. A field configured as pur-GrantCE-ModeA indicates that a PUR grant is for a CE mode A. Furthermore, a field configured as pur-GrantCE-ModeB indicates that a PUR grant is for a CE mode B (Indicates UL grant for transmission using PUR. Field set to pur-GrantCE-ModeA indicates the PUR grant is for CE Mode A and the field set to pur-GrantCE-ModeB indicates the PUR grant is for CE Mode B.).

pur-RSRP-ChangeThreshold: this indicates a change critical value of RSRP of a serving cell in a dB unit for a timing advance (TA) validation check. value dB4 corresponds to 4 dB, and value dB6 corresponds to 6 dB. When rsrp-ChangeThresh is included, if rsrp-DecreaseThresh is not present, a rsrp-IncreaseThresh value may also be used in rsrp-DecreaseThresh. When ur-RSRP-ChangeThreshold is not configured, a TA validation check based on a change in the RSRP of a serving cell is not applied (Indicates the threshold of change in serving cell RSRP in dB for TA validation. Value dB4 corresponds to 4 dB, value dB6 corresponds to 6 dB and so on. When rsrp-ChangeThresh is included, if rsrp-DecreaseThresh is absent the value of rsrp-IncreaseThresh is also used for rsrp-DecreaseThresh. If pur-RSRP-ChangeThreshold is not configured, TA validation based on change in serving cell RSRP is not applicable.).

pur-TimeAlignmentTimer: this indicates an idle mode TA timer in a second unit for a TA validation check. An sXX value corresponds to XX(s), and an sYY value corresponds to YY(s), etc. When pur-TimeAlignmentTimer is configured, a TA is considered to be invalid when an idle mode TA timer expires. Alternatively, when pur-TimeAlignmentTimer is not configured, a TA validation check based on an idle mode TA timer is not applied (Indicates the idle mode TA timer in seconds for TA validation. Value sXX corresponds to XX s, value sYY corresponds to YY s and so on. When pur-TimeAlignmentTimer is configured, the TA is considered invalid upon the expiry of idle mode TA timer. If pur-TimeAlignmentTimer is not configured, TA validation based on idle mode TA timer is not applicable.).

timeOffset: this indicates a time interval related to a current time up to the first PUR occasion (Indicates the time gap with respect to current time until the first PUR occasion.).

The PUR configuration information (PUR-Config IE) may further include information, such as the start point of a PUR resource, the period of a PUR resource, etc. in addition to the information.

2) Next, the UE transits from the RRC connected state to a specific state for uplink transmission through a PUR. The specific state may be an RRC idle state or an RRC inactive state. Hereinafter, a case where the UE performs PUR transmission in the RRC idle state is described as an example.

3) Next, the UE in the RRC idle state performs uplink transmission to the base station in a first time unit based on the PUR configuration information. That is, the UE performs uplink transmission based on a PUR-related parameter(s) included in the PUR configuration information. The first time unit may be a specific PUR resource or PUR occasion.

4) Thereafter, the UE in the RRC idle state receives, from the base station, a first message for updating the PUR configuration information. The first message may be RRC signaling, a MAC CE or DCI. The "update of the 'PUR configuration information' may mean that some or all of a PUR parameter(s) currently configured in the UE are changed. For example, this may mean that the UE changes some or all of a configured PUR parameter(s) based on PUR configuration information in the RRC connected state.

5) Finally, the UE in the RRC idle state transmits an uplink signal to the base station in a second time unit based on the PUR configuration updated based on the first message. The second time unit may be a specific PUR resource or a specific PUR occasion. In this case, the second time unit may be the same time unit as the first time unit or may be a time unit after the first time unit. For example, a case where the second time unit is the same as the first time unit may be a case where a PUR configuration of the UE after the initial PUR transmission of the UE in a PUR #n has been updated and a case where PUR transmission is performed by applying a PUR configuration updated in the same PUR #n (PUR occasion).

Furthermore, a case where the second time unit is a time unit after the first time unit may be a case where a PUR configuration of a UE after the initial PUR transmission of the UE in a PUR #n is updated and a case where PUR transmission is performed by applying a PUR configuration updated in a PUR #n that is a next PUR resource. More specifically, after the PUSCH initial transmission of the UE, an updated PUR configuration may be applied to PUSCH transmission based on the UL grant of the UE or the PUR re-transmission of the UE. In this case, the UL grant may be the same DCI as DCI for a PUR configuration update and may be separate DCI.

The aforementioned 1) to 5) operations may be applied to PUR configuration update methods hereinafter described in (Proposal 1) to (Proposal 3) in common. Hereinafter, detailed contents related to a PUR configuration update procedure are described.

(Proposal 1) L1 PUR Configuration Update Reliability Improvement Method Based on Uplink Transmission in a Next PUR Resource after a PUR Configuration Update is Performed The present proposal relates to a method of performing PUR transmission and a PUR configuration update are performed in a specific PUR resource, performing PUR transmission in a next PUR resource of a specific PUR resource, and determining whether an L1 PUR configuration update is successful based on the PUR transmission in the next PUR resource.

More specifically, a UE performs PUR transmission in a next PUR by applying a PUR configuration parameter updated based on L1 signaling. A base station/network checks a PUR configuration update by receiving the PUR transmission.

For example, when a UE performs PUR transmission in a current PUR resource and a base station/network transmits PUR configuration parameter update information in a current PUR SS related to a current PUR resource and/or indicates a PUR configuration update, the UE may perform PUR transmission by incorporating a parameter(s) included in information transmitted in a PUR SS in a next PUR resource. The base station/network may check (determine) whether the PUR configuration update is successful by receiving the PUR transmission in the next PUR resource. In this case, the PUR transmission in the next resource may be transmitted for the purpose of notifying the base station/network of whether the PUR configuration update is successful. The current PUR resource may be a PUR resource #n. The next PUR resource may be a PUR resource #n+1. The current PUR SS may be a PUR SS #n. In the present disclosure, for convenience of description, a PUR resource next the current PUR resource may be simply called a 'next PUR resource'.

A base station/network may check whether a PUR configuration update is successful based on whether PUR transmission in a next PUR resource is successfully received. That is, when the base station/network indicates a PUR configuration update in a current PUR SS and successfully receives PUR transmission in a next PUR resource, the base station/network may recognize that the PUR configuration update has been successfully performed. In this case, the base station/network may assume that a PUR configuration has been updated in order to receive transmission in a next PUR resource.

Alternatively, the base station/network may perform a hypothesis test or blind detection (blind detection) on a value before a PUR configuration update of a specific PUR configuration parameter and a value after an update in order to check whether a PUR configuration update is successful. For example, the hypothesis test or the blind detection may be performed on a repetition transmission number (repetition number) before an update and a repetition transmission number after the update.

For convenience of description, the contents described in relation to an operation based on the present (Proposal 1) have been described without considering whether uplink transmission data in a PUR resource is present. An operation of a UE/base station based on the present (Proposal 1) may be performed in a different aspect depending on whether uplink transmission data in a next PUR resource is present.

First, when new uplink transmission data is not present in a next PUR resource, a UE may perform an operation based on the present (Proposal 1) as follows.

When the UE performs PUR transmission in a current PUR resource and a base station/network transmits PUR configuration parameter update information in a current PUR resource related to a current PUR SS and/or indicates a PUR configuration update, the UE performs PUR transmission in a next PUR resource by applying an updated PUR configuration regardless of whether new data for uplink transmission at next PUR resource timing is present. The updated PUR configuration may be based on a PUR configuration parameter(s) received through a current PUR SS or a PUR configuration parameter(s) indicated to be used when the UE performs a PUR configuration update. In this case, 'performs PUR transmission regardless of whether new data is present in a next PUR resource' means that when new data is present, the UE naturally performs uplink transmission in the next PUR resource and when new data is not present (i.e., if new data is not generated), the UE performs uplink transmission in a next PUR resource.

When new data for uplink transmission is not present in a next PUR resource, the UE may include dummy data in an uplink signal in order to transmit the uplink signal in a next PUR resource. The dummy data may be meaningless data. For example, the dummy data may be data configured in a way to set all bits of the dummy data to 0 or to 1, and may be randomly generated data.

Furthermore, when new data for uplink transmission in a next PUR resource is not present, the UE may include the same data (hereinafter called 'previous data') as data transmitted in a current PUR resource or (when uplink data was not present in a current PUR) or before the current PUR resource in order to transmit an uplink signal in the next PUR resource.

As described above, when uplink data to be transmitted in a next PUR resource is not present, the UE may perform uplink transmission by applying an updated PUR configuration parameter to an uplink signal including dummy data or previous data. In this case, the UE may indicate, in a base station/network, that the dummy data or previous data is included in the uplink signal by including information on a data type of the uplink signal in a MAC header.

When a UE performs an operation for a PUR configuration update based on (Proposal 1), the UE operation may be determined depending on whether the UE succeeds in L1 signaling (DCI) reception for a PUR configuration update. More specifically, the operation of the UE may be divided into a case where the UE fails in DCI reception (Case 1) and a case where the UE succeeds in DCI reception (Case 2). In addition, the (Case 1) may be divided into (Case 1-1) and (Case 1-2) depending on whether uplink transmission data in a next PUR resource is present. Furthermore, the (Case 2) may also be divided into (Case 2-1) and (Case 2-2) depending on whether uplink transmission data in a next PUR resource is present.

Hereinafter, the (Case 1) to (Case 2) and detailed contents according to each of the cases are described.

(Case 1) a case where a UE fails in DCI reception for an L1 PUR configuration update in a current PUR SS (Case 1-1) when uplink transmission in a next PUR resource data is present When uplink data to be transmitted in a next PUR is present, a UE transmits data based on a PUR configuration parameter(s) before a PUR configuration update in a next PUR resource (because DCI reception for a PUR configuration update has failed). That is, an uplink signal transmitted in a next PUR includes generated data. The uplink signal may be transmitted by applying a parameter(s) before a PUR configuration is updated. At this time, a base station/network recognizes the failure of the PUR configuration update in the next PUR resource. That is, the base station/network may recognize that the failure of the PUR configuration update in the next PUR resource based on that a PUR configuration parameter before an update has been applied to an uplink signal transmitted in a next PUR.

When a base station/network recognizes that a PUR configuration update has failed, the base station/network may assume that a UE performs PUR transmission by applying a parameter before an update even in a PUR resource after a next PUR resource.

In this case, the base station may additionally (re)transmit DCI for a PUR configuration update. The additionally transmitted DCI (second DCI) may include information such as DCI (first DCI) that the UE fails to receive or may include other information. That is, the same parameters may be set as different values and included in the first DCI and the second DCI (Case 1) or different parameters may be included in the first DCI and the second DCI (Case 2). Alternatively, some of parameters included in the first DCI and the second DCI, respectively, may be the same or some of them may be different (Case 3). Case 1 to Case 3 may be combined to form another case related to configurations of the first DCI and the second DCI.

(Case 1-2) when uplink data in a next PUR resource is not present

When update data to be transmitted in a next PUR is not present, a UE may skip PUR transmission in a next PUR resource. In the present disclosure, 'skip PUR transmission' may mean that uplink transmission in a specific PUR resource or a PUR occasion in a specific PUR resource is dropped.

At this time, a base station/network does not receive any signal from the UE in the next PUR resource. In this case, the base station/network may recognize the failure of a PUR configuration update in the next PUR resource.

When the base station/network recognizes that a PUR configuration update has failed, the base station/network may assume that the UE performs PUR transmission by applying a parameter before an update even in a PUR resource after the next PUR resource.

Furthermore, when data to be transmitted in a next PUR resource is not present, the UE may be configured to monitor a PUR SS or an MPDCCH SS related to the next PUR resource for a PUR configuration parameter update or PDSCH reception, etc. although data to be transmitted in the next PUR resource is not present. To the contrary, when data to be transmitted in a next PUR resource is not present, the UE may be configured to not monitor a PUR SS or an MPDCCH SS for the purpose of power saving, etc.

In addition, when data to be transmitted in a next PUR resource is not present, a base station/network may semi-statically or dynamically configure whether the UE will perform monitoring for a PUR SS or an MPDCCH SS. For example, if the base station/network can semi-statically configure whether to perform monitoring for a PUR SS or an MPDCCH SS in the UE, whether to perform monitoring for the PUR SS or MPDCCH SS may be delivered to the UE in the form of a PUR configuration parameter. That is, a parameter related to the monitoring may be included in PUR configuration information that the UE receives from a base station in an RRC connected state. Furthermore, a parameter related to the monitoring may be included in the L1 signaling upon L1 signaling for a PUR configuration update.

In this case, if the UE is configured to monitor a PUR SS or MPDCCH SS related to a next PUR resource although data to be transmitted in the next PUR resource is not present, the base station/network may additionally (re)transmit additional DCI for a PUR configuration update on the PUR SS or the MPDCCH SS.

Alternatively, when data to be transmitted in a next PUR resource is not present, if the UE is configured to not monitor a PUR SS or MPDCCH SS related to a next PUR resource, the UE may not (re)transmit additional DCI for a PUR configuration update. In this case, the DCI may be (re)transmitted in a next PUR resource of the next PUR resource. In this case, the next PUR resource may be a PUR resource #n+1, and a next resource thereof may be a PUR resource #n+2.

(Case 2) a case where a UE succeeds in DCI reception for an L1 PUR configuration update in a current PUR SS (Case 2-1) when uplink data in a next PUR resource is present When update data to be transmitted in a next PUR is present, a UE transmits data based on an updated PUR configuration parameter(s) in a next PUR resource. That is, an uplink signal transmitted a next PUR includes generated data. The uplink signal may be transmitted by applying an updated PUR parameter(s). At this time, a base station/network may recognize that a PUR configuration update has been successfully performed in a next PUR resource. That is, the base station/network may recognize the success of the PUR configuration update in the next PUR resource based on that the updated PUR configuration parameter has been applied to the uplink signal transmitted in the next PUR. When the base station/network recognizes that the PUR configuration update is successful, the base station/network may assume that the UE performs PUR transmission by applying the updated parameter to a PUR resource after the next PUR resource.

In this case, the base station/network may additionally transmit DCI for a PUR configuration update. A case where the base station/network additionally transmits DCI for a PUR configuration update may be a case where the base station/network has determined that a change in the PUR configuration parameter is further necessary as a result of the reception of an uplink signal transmitted in a next PUR resource. A case where the base station/network determines that a change in the PUR configuration parameter will be further necessary may be a case where a PUR configuration update has been successfully performed on only some of parameters indicating an update, a case where a PUR configuration change is necessary because timing of a communication environment indicating a PUR update is changed, etc.

(Case 2-2) when uplink data in a next PUR resource is not present

When update data to be transmitted in a next PUR is not present, a UE may transmit dummy data in a next PUR resource or may retransmit the same data as data transmitted in a current PUR resource or a PUR resource thereof. The dummy data may be meaningless data. For example, the dummy data may be data configured in a way to set all bits of the data to 0 or to 1. Furthermore, the dummy data may be randomly generated data.

At this time, a base station/network recognizes that a PUR configuration update in a next PUR resource is successful. That is, the base station/network may recognize the success of a PUR configuration update in a next PUR resource based on that an updated PUR configuration parameter has been applied to an uplink signal transmitted in a next PUR and an uplink signal includes dummy data or the same data as data transmitted in a current PUR resource or a PUR resource before the current PUR resource. When the base station/network recognizes that a PUR configuration update is successful, the base station/network may assume that the UE performs PUR transmission by applying the updated parameter even in a PUR resource after a next PUR resource.

In this case, the base station/network ╞ may additionally transmit DCI for a PUR configuration update. A case where the base station/network additionally transmits DCI for a PUR configuration update may be a case where the base station/network has determined that a change in the PUR configuration parameter is further necessary as a result of the reception of an uplink signal transmitted in a next PUR resource. A case where the base station/network determines that a change in the PUR configuration parameter will be further necessary may be a case where a PUR configuration update has been successfully performed on only some of parameters indicating an update, a case where a PUR configuration change is necessary because timing of a communication environment indicating a PUR update is changed, etc.

If PUR skipping is permitted, when data to be transmitted in a specific PUR resource is not present, the UE skips the specific PUR resource without performing PUR transmission in the specific PUR resource. After the PUR skipping, a value of a PUR skipping counter for a PUR release may be increased or decreased. However, in the present proposal, when update data to be transmitted in a next PUR is not present, the UE needs to skip a next PUR resource, but performs PUR transmission in a next PUR resource for the purpose of notifying the base station of whether to perform a PUR configuration update. In this case, although the UE has performed PUR transmission in the next PUR resource, the PUR transmission is not PUR transmission for actual data transmission, but corresponds to PUR transmission for the purpose of notifying the base station of whether to perform a PUR configuration update. Accordingly, a PUR skipping counter of the UE for a PUR release may count, as a skipping event, PUR transmission in the next PUR resource although PUR transmission has been performed in the next PUR resource. That is, the next PUR resource may be considered as a skipped resource. Timing at which a value of the PUR skipping counter is changed (increased or decreased) may be timing at which the UE has recognized that data to be transmitted in a next PUR resource is not present.

In particular, if the UE recognizes that data to be transmitted in a next PUR resource is not present and a value of the PUR skipping counter reaches a specific threshold for a PUR release as a result of a change in the value of the PUR skipping counter, the UE may not perform PUR transmission for confirming a PUR configuration update in a next PUR resource. Furthermore, in this case, the UE may perform or expect a PUR release operation with respect to a PUR including a next PUR resource.

When a PUR skipping counter is used to count whether PUR transmission is impossible during given time duration not for a PUR release, as long as the base station/network can detect (and/or successful decoding) or succeed in PUR transmission for confirming a PUR configuration update in a next PUR resource, the PUR skipping counter may not count the next PUR resource as a PUR skipping event.

(Proposal 2) Indicate Whether to Perform a PUR Configuration Update Based on a Parameter Configured for a PUR Purpose in a Next PUR Resource or a Resource Configured for Purposes Other than a PUR in a next PUR resource, (i) a UE may indicate whether to perform a PUR configuration update in a base station/network by using a PUR configuration parameter(s) or PUR resource semi-statically configured for a PUR purpose or (ii) if a resource has not been configured for a PUR purpose, a UE may indicate whether to perform a PUR configuration update in a base station/network by using a resource semi-statically configured for another purpose from a base station. For example, the resource semi-statically configured for another purpose may be a CSI report, a dedicated demodulation reference signal (DM-RS), and a sounding reference signal (SRS).

Hereinafter, for convenience of description, a case where a UE indicates whether to perform a PUR configuration update in a next PUR resource based on a PUR configuration parameter(s) configured for a PUR purpose is basically described.

Some of a PUR configuration parameter(s) may be a DM-RS pattern or a time/frequency domain resource.

In the case of the DM-RS pattern, a method of indicating whether to perform a PUR configuration update in a next PUR resource based on a PUR configuration parameter(s) may be performed in a way that a UE applies a specific offset value to a semi-statically configured value in relation to a DMRS base sequence, a cyclic shift, an orthogonal cover code (OCC), etc.

For example, a UE is semi-statically configured with a specific value with respect to a DM-RS base sequence from a base station. The specific value may be one of candidate values given in a table form. When the specific value is indicated as an index of candidate values included in a table, the specific offset may be applied in a way to be added (+) or subtracted (−) from the index. That is, the base station may confirm whether a PUR configuration update is performed based on that a specific offset has been applied to a value semi-statically configured for the UE.

In this case, when a value obtained by adding (or subtracting) the specific offset to (or from) the value semi-statically configured for the UE exceeds the number of candidate values, a modulo operation may be applied to the number of candidate values. For example, if a semi-statically index 7 is indicated for the UE and the number of candidate values is 12, when an offset 6 is added to the semi-statically configured index (it becomes 13), a value of 1 may be obtained by performing a modulo operation based on 12, that is, the number of candidate values, on the value 13 to which the offset is added.

In order to help understanding of a method provided in the present proposal, an operation sequence of a UE based on the present proposal is described, assuming a case where a UE configures one of 12 DM-RS cyclic shift values (index=0, 1, . . . , 11) as a parameter for PUR configuration update indication through a PUR configuration and configures, in a base station/network, a specific offset value 6 for indicating a PUR configuration update. In this case, the UE assumes that 0 among the DM-RS cyclic shift candidate value indices=0, 1, . . . , 11 has been set.

1) First, a UE performs PUR transmission in a current PUR resource (PUR resource #n) by using a cyclic shift index '0'.
2-1) after the 1), if the UE is not indicated with a PUR configuration update through a current PUR SS (PUR SS #n) after performing PUR transmission in the current PUR resource (PUR resource #n), the UE performs PUR transmission by applying the same parameter (i.e., index=0) even in a next PUR resource (PUR resource #n+1).
2-2) after the 1), if the UE is indicated with a PUR configuration update through a current PUR SS (PUR SS #n) after performing PUR transmission in a current PUR resource (PUR resource #n), the UE performs the PUR configuration update, and performs PUR transmission by applying a parameter (i.e., index=6) to which an offset value has been applied and an updated PUR configuration in the next PUR resource (PUR resource #n+1).

In this case, when new data to be transmitted in a next PUR resource is not present, the UE performs PUR transmission by applying the parameter to which the offset value has been applied. In this case, an uplink signal transmitted through the PUR transmission may include dummy data or data transmitted in the current PUR resource.

A method of applying an offset value to a parameter for indicating a PUR configuration update may include the following two types.

First, whenever a PUR configuration update is performed, a specific offset may be cumulatively applied to a parameter. For example, assuming that upon first PUR transmission, a value of a parameter is 0 and an offset is 6, a candidate value is 12, and a PUR configuration update is performed whenever PUR transmission of a UE is performed three times, it may result in {0 (perform update), 6,6,6 (perform update), 0,0,0 (perform update), 6,6,6, . . . }.

Second, after a PUR configuration update is performed in a current PUR resource, a specific offset may be applied to a parameter only upon PUR transmission in a next PUR resource, and PUR transmission may be performed by applying a first configured parameter value until a next PUR update is performed from a next PUR resource. For example, assuming that upon first PUR transmission, a value of a parameter is 0, an offset is 6, a candidate value is 12, and a PUR configuration update is performed whenever PUR transmission of a UE is performed three times, a parameter value according to the PUR transmission may be as follows. {0 (perform update), 6,0,0 (perform update), 6,0,0 (perform update), 6,0,0, . . . }.

A method provided in the present proposal may be identically applied to a case where a DMRS cyclic shift (cyclic shift) value configured in a UE has the same eight candidate values as in the LTE system.

In this case, a specific offset value may be transmitted along with information for a PUR configuration parameter update through DCI upon L1 PUR configuration update.

(Proposal 3) Indicate Whether to Perform a PUR Configuration Update by Using a MAC CE or UCI after a PUR Configuration Update The present proposal relates to a method of explicitly indicating, by a UE, whether a PUR configuration update is successful with respect to a base station/network after a PUR configuration update. Information for indicating, by the UE, whether a PUR configuration update is successful with respect to the base station/network may be simply called 'PUR configuration update indication information'.

A UE may indicate whether to perform a PUR configuration update with respect to a base station/network through a PUSCH in a MAC CE form on a next PUR resource. Alternatively, the UE may indicate, in the base station, whether to perform a PUR configuration update by transmitting PUR configuration update indication information having a UCI form simultaneously with a PUSCH in a next PUR resource.

If the UE indicates whether to perform a PUR configuration update in the base station/network through a PUSCH in a MAC CE form, when performing PUR transmission in a next PUR resource, when data to be transmitted in a next PUR resource is present, the MAC CE may be multiplexed with the data and transmitted in a MAC level.

Alternatively, if data to be transmitted in a next PUR resource is not present, the MAC CE may replace dummy data and may be transmitted by being multiplexed with some or all of data (i.e., retransmission data) transmitted in a current PUR resource (e.g., #n resource). That is, the MAC CE may be included in an uplink signal transmitted in a next PUR resource instead of dummy data or the MAC CE may be included in an uplink signal transmitted in a next PUR resource in a form in which the MAC CE is multiplexed with some or all of the same data as data transmitted in a current PUR resource or a PUR resource before the current PUR resource in a MAC level.

If PUR configuration update indication information is transmitted in a UCI form, when a UE performs PUR transmission in a next PUR resource, the PUR configuration update indication information may have a form in which the UCI punctures uplink data. Alternatively, the PUR configuration update indication information may have a form in which uplink data is rate-matched with the UCI. In this case, the uplink data may be one of new data generated in a next PUR resource, dummy data or the same data as data transmitted in a current PUR resource or a PUR resource before the current PUR resource.

Information for indicating whether to perform a PUR configuration update, which is transmitted as a MAC CE or UCI may be information on whether an individual parameter(s) updated through DCI is updated in a current PUR resource (e.g., #n resource), or may be information on whether some or all of a parameter(s) is updated. Furthermore, the information may be information on whether a parameter(s) divided for each group is updated after a specific parameter(s) is grouped.

PUR SS Monitoring Method Upon L1 PUR Configuration Update—(Method 2)

The present method relates to PUR SS monitoring of a UE upon PUR configuration update through L1 signaling. A UE may perform the update of a PUR configuration through the following procedure.

1) The UE receives, from a base station, PUR configuration information for uplink transmission through a PUR through higher layer signaling in an RRC connected state.
2) The UE transits from the RRC connected state to a specific state for uplink transmission through a PUR. The specific state may be an RRC idle state or an RRC inactive state. Hereinafter, a case where the UE performs PUR transmission in the RRC idle state is described as an example.
3) Next, the UE in the RRC idle state performs uplink transmission to the base station in a first time unit based on the PUR configuration information. The first time unit may be a specific PUR resource or PUR occasion.
4) Next, the UE in the RRC idle state attempts the reception of DCI for updating the PUR configuration information. In this case, some or all of parameters related to a PUR configuration pre-configured in the UE may be updated and included in the DCI.
5-1) (when the UE succeeds in the reception of DCI) the UE in the RRC idle state transmits an uplink signal to the base station in a second time unit based on the PUR configuration an updated through the DCI. The second time unit may be a specific PUR resource or a specific PUR occasion. In this case, the second time unit may be the same time unit as the first time unit or may be a time unit after the first time unit.
5-2) (When the UE fails in the reception of DCI) the UE in the RRC idle state may perform monitoring for a PUR SS in order to receive information after PUR transmission through the following Proposal 1) to Proposal 3) proposed hereinafter. The information after the PUR transmission may be downlink feedback information (information for a HARQ operation, etc.), UL grant DCI, DL assignment DCI, etc.

In particular, if the UE fails in the reception of DCI indicating an L1 PUR configuration update or a base station/network fails in the reception of a PUSCH transmitted through a PUR, there may be a difference between a PUR SS(s) expected by the UE and a PUR SS(s) in which the base station/network transmits DCI.

More specifically, a total of four cases may be possible based on whether a UE succeeds in DCI reception and whether a base station receives a PUSCH through a PUR. That is, (1) a DCI reception failure of the UE and a PUSCH reception failure of the base station (Case 1), (2) a DCI reception failure of the UE and a PUSCH reception success of the base station (Case 2), (3) a DCI reception success of the UE and a PUSCH reception failure of the base station (Case 3) and (4) a DCI reception success of the UE and a PUSCH reception failure of the base station (Case 4) may be possible.

In the case of (Case 1), since a UE has failed in the reception of DCI indicating a PUR configuration update in a PUR SS for a current PUR SS, the UE expects a PUR SS for a next PUR resource based on a PUR configuration before the update. Furthermore, a base station cannot confirm whether a PUR configuration update is successful because it does not receive a PUSCH from the UE.

(1) If the base station transmits DCI in a PUR SS based on an updated PUR configuration assuming the success of the update of the PUR configuration, a difference occurs between the PUR SS expected by the UE and the PUR SS in which the base station transmits DCI.

(2) In contrast, if the base station transmits DCI in a PUR SS based on a PUR configuration before the update assuming the failure of the update of the PUR configuration, a difference does not occur between the PUR SS expected by the UE and the PUR SS in which the base station transmits DCI.

However, in the case of (Case 1), if the base station has been configured to recognize a PUSCH reception failure as a PUR configuration update failure based on Proposal 1 of the aforementioned (method 1), there is no case where a difference occurs between the PUR SS expected by the UE and the PUR SS in which the base station transmits DCI in the case of (Case 1).

In the case of (Case 2), since a UE has failed in the reception of DCI indicating a PUR configuration update in a PUR SS for a current PUR SS, the UE expects a PUR SS for a next PUR resource based on a PUR configuration before the update. Furthermore, the base station cannot confirm whether the PUR configuration update is successful based on a received PUSCH because the base station has received the PUSCH from the UE. That is, the base station may transmit DCI in a PUR SS to which the updated PUR configuration has been applied based on the confirmation of the PUR configuration update. Accordingly, in the case of (Case 2), there is no case where a difference occurs between the PUR SS expected by the UE and the PUR SS in which the base station transmits DCI in a next PUR resource.

In the case of (Case 3), since a UE has succeeded in the reception of DCI indicating a PUR configuration update in a PUR SS for a current PUR SS, the UE expects a PUR SS for a next PUR resource based on an updated PUR configuration. Furthermore, a base station cannot confirm whether the PUR configuration update is successful because it does not receive a PUSCH from the UE.

(1) If the base station transmits DCI in a PUR SS based on an updated PUR configuration assuming the success of the update of the PUR configuration, a difference does not occur between the PUR SS expected by the UE and the PUR SS in which the base station transmits DCI.

(2) In contrast, if the base station transmits DCI in a PUR SS based on a PUR configuration before an update assuming the failure of the update of a PUR configuration, a difference occurs between a PUR SS expected by the UE and the PUR SS in which the base station transmits DCI.

However, in the case of (Case 3), unlike the case of (Case 1), although the base station has been configured to recognize a PUSCH reception failure as a PUR configuration update failure based on Proposal 1 of the aforementioned (method 1), the UE expects a PUR SS based on an updated PUR configuration, and the base station transmits DCI in a PUR SS before an update. Accordingly, a difference occurs between the PUR SS expected by the UE and the PUR SS in which the base station transmits DCI in a next PUR resource.

Finally, in the case of (Case 4), since a UE has succeeded in the reception of DCI indicating a PUR configuration update in a PUR SS for a current PUR SS, the UE expects a PUR SS for a next PUR resource based on an updated PUR configuration. Furthermore, a base station can confirm whether the PUR configuration update is successful based on a received PUSCH because it has received a PUSCH from the UE. That is, the base station may transmit DCI in a PUR SS to which an updated PUR configuration has been applied based on the confirmed PUR configuration update. Accordingly, in the case of (Case 4), there is no case where a difference occurs between the PUR SS expected by the UE and the PUR SS in which the base station transmits DCI in a next PUR resource.

The contents described in the (Case 1) to the (Case 4) are summarized as in the following table.

TABLE 8

| | Whether a difference occurs between a PUR SS expected by a UE and a PUR SS transmitted by a base station | | Notes |
|---|---|---|---|
| (Case 1) UE-DCI reception failure Base station-PUSCH reception failure | The base station assumes a PUR update failure | X | If a method of Proposal 1 of (Method 1) is followed, a difference does not occur between a PUR SS expected by a UE and a PUR SS transmitted by a base station |
| | The base station assumes a PUR update success | O | |
| (Case 2) UE-DCI reception failure Base station-PUSCH reception success | | X | |
| (Case 3) UE-DCI reception success Base station-PUSCH reception failure | The base station assumes a PUR update failure | O | Although a method of Proposal 1 of (Method 1) is followed, a difference occurs between a PUR SS expected by a UE and a PUR SS transmitted by a base station |
| | The base station assumes a PUR update success | X | |
| (Case 4) UE-DCI reception success Base station-PUSCH reception success | | X | |

According to Table 8, it may be preferred that a PUR SS monitoring method proposed in the present method is applied to the cases of (Case 1) and (Case 3). Furthermore, in the case of (Case 1), according to Proposal 1 of the aforementioned (Method 1), the present method may be more preferably applied to the case of (Case 3) because a difference between does not occur a PUR SS expected by a UE and a PUR SS in which a base station transmits DCI.

Hereinafter, two methods for monitoring a PUR SS proposed in the present method are described.

(Option 1) A UE performs a PUR SS monitoring operation on a union of a PUR SS(s) assuming a PUR configuration parameter before an L1 PUR configuration update and a PUR SS(s) assuming a PUR configuration parameter after the PUR configuration update.

In the present method related to (Option 1), the UE may monitor both the PUR SS(s) before the PUR configuration update and the PUR SS(s) after the PUR configuration update. A base station/network may transmit DCI to the UE based on a result of the execution of a hypothesis test and blind detection.

(Option 2) A UE performs a PUR SS monitoring operation on an intersection of a PUR SS(s) assuming a PUR configuration parameter before an L1 PUR configuration update and a PUR SS(s) assuming a PUR configuration parameter after the PUR configuration update.

In the present method related to (Option 2), the UE may perform monitoring only a PUR SS(s) expected to be monitored before the L1 PUR configuration update and a PUR SS(s) with which a PUR SS expected to be monitored after the L1 PUR configuration update is overlapped. Furthermore, the base station/network may transmit DCI to the UE with respect to only the overlapped PUR SS(s).

In the present method related to (Option 2), a PUR SS(s) may be (periodically) configured based on an absolute time, and the present method related to (Option 2) may be applied to only a method of determining a specific PUR SS(s) on which monitoring is performed based on a PUR configuration parameter. In this case, the absolute time may be an absolute subframe index, and the PUR configuration parameter may be PUR duration.

If an intersection of a PUR SS to which a configuration before an update has been applied and a PUR SS to which a configuration after the update has been applied is not present, the UE may perform PUR SS monitoring based on the method of the (Option 1). The UE may determine whether an intersection of the PUR SS to which the configuration before the update has been applied and the PUR SS to which the configuration after the update has been applied is present based on DCI received in a PUR SS related to a current PUR resource. Furthermore, in this case, the base station may be configured to transmit DCI in at least one of a PUR SS before a PUR update or a PUR SS after the PUR update.

When comparing (Option 1) and (Option 2), (Option 2) may have an advantage in terms of UE power saving because a PUR SS(s) to be monitored is reduced compared to (Option 1). In contrast, (Option 1) may have an advantage in terms of base station/network flexibility because there are relatively many occasions in which a base station/network may transmit DCI.

As described above, in order for a UE to perform PUR SS monitoring based on (Option 1) and (Option 2), the UE needs to be able to check both a PUR configuration before a PUR configuration update and a PUR configuration after a PUR configuration update. Accordingly, it may be preferred that the method described in the present method is applied to (Case 3) and (Case 4) corresponding to a case where the UE succeeds in DCI reception among the described (Case 1) to (Case 4). In particular, as described above, in the case of (Case 4), it can be confirmed that a difference does not occur between a PUR SS expected by a UE and a PUR SS expected by a base station. The method provided in the present method may be preferably applied to the case of (Case 3).

Furthermore, both the (Option 1) and the (Option 2) may be applied to an L1 PUR configuration update method proposed in the present disclosure.

In particular, as described above, in the cases of (Case 1) to (Case 4), in the cases of (Case 1), (Case 2) and (Case 4), the UE can efficiently perform monitoring in a PUR SS related to a next PUR resource even without applying (method 2), based on Proposal 1 of (Method 1) proposed in the present disclosure. That is, a difference may not occur between the PUR SS expected by the UE and the PUR SS in which the base station transmits DCI. Accordingly, for an efficient operation of the UE, the UE may be configured to perform (Method 2) only in the case of (Case 3) (i.e., only when the reception of DCI in a current PUR SS is successful).

In the present disclosure, a PUR SS' has been expressed and described for convenience of description, but the PUR SS may be extended in the form of an MPDCCH SS, an NPDCCH SS, etc. Furthermore, the methods, embodiments, and descriptions for embodying the methods described and proposed in the present disclosure may be applied separately or one or more of them may be combined and applied.

FIG. 32 is a flowchart illustrating an example of an operation embodied in a UE, for performing, by a UE, a method of transmitting an uplink signal through a preconfigured uplink resource (PUR) in a wireless communication system, which is proposed in the present disclosure.

More specifically, in a method by a user equipment for transmitting an uplink signal through a preconfigured uplink resource (PUR) in a wireless communication system, a UE receives, from a base station, PUR configuration information for uplink signal transmission based on a PUR in a radio resource control (RRC) connected state (S3210).

Next, the UE transits from the RRC connected state to an RRC idle state (S3220).

Thereafter, the UE receives, from the base station, first downlink control information (DCI) including first PUR update information for updating a PUR configuration on a first resource of the PUR (S3230).

Finally, the UE transmits, to the base station, a first uplink signal on a second resource of the PUR based on whether the first DCI is received by the user equipment (S3240).

In this case, based on that the user equipment succeeds in receiving the first DCI, the first uplink signal is transmitted by applying the PUR configuration based on the first PUR update information regardless of whether data for uplink transmission on the second resource is present.

Furthermore, based on the data for the uplink transmission on the second resource being not generated, the first uplink signal may include dummy data or the same data as specific uplink data transmitted on a resource before the second resource.

Additionally, the second resource to which the first uplink signal is transmitted may be counted as a skipping event by a PUR skipping counter for releasing the PUR.

Furthermore, based on a value of the PUR skipping counter reaching a specific threshold for releasing the PUR by the second resource being counted as the skipping event, the transmission of the first uplink signal may be dropped and the PUR may be released.

For another example, based on the data for the uplink transmission on the second resource being generated, the first uplink signal may includes the generated data.

For another example, (i) the user equipment fails to receive the DCI and (ii) the data for the uplink transmission on the second resource is not generated, the UE may additionally perform an operation of skipping the transmission of the first uplink signal on the second resource.

In this case, the UE may additionally perform operation of receiving, from the base station, indication information indicating to perform monitoring for the reception of second PUR update information after the skipping transmission of the first uplink signal even when the data for the uplink transmission on the second resource is not generated, based on the data for the uplink transmission on the second resource being not generated. In this case, the indication information may be included in at least one of the PUR configuration information or the DCI.

Furthermore, the monitoring may be performed in at least one of PUR search space (SS) or machine type communication physical downlink control channel search space (MPDCCH SS).

Additionally, the UE may perform an operation of receiving, from the base station, second DCI including the second PUR update information based on skipping of the transmission of the first uplink signal on the second resource.

Furthermore, based on that (i) the user equipment fails to receive the DCI and (ii) the data for the uplink transmission on the second resource being generated, the first uplink signal may include the generated data, and may be transmitted by applying the PUR configuration based on the first PUR configuration information.

Additionally, based on the PUR configuration being updated, a specific offset value for indicating to the base station whether the PUR configuration is updated may be applied to values of some parameters which are semi-statically configured, among parameters related to the PUR configured. The first uplink signal may be transmitted based on the values of the some parameters to which the specific offset value is applied. The specific offset value may be included in the first DCI.

In this case, based on the some parameters being a demodulation reference signal (DM-RS) pattern, the specific offset value may be applied to at least one of a DM-RS sequence, a cyclic shift or an orthogonal cover code (OCC).

Furthermore, the first uplink signal may include indication information for whether the PUR configuration is updated. Based on the data for the uplink transmission on the second resource being not generated, (i) the indication information may be included in the first uplink signal by replacing dummy data by a medium access control (MAC) control element (CE) related to the indication information or (ii) the indication information may be included in the first uplink signal in a form in which the MAC CE is multiplexed at a MAC level with all or part of data same with the specific uplink data transmitted on the resource before the second resource. Based on the data for the uplink transmission on the second resource being generated, the indication information may be included in the first uplink signal in a form in which the MAC CE is multiplexed with the generated data at the MAC level.

Furthermore, the first uplink signal may include uplink control information (UCI) including indication information indicating whether the PUR configuration is updated. (i) The uplink control information may be punctured with uplink data included in the first uplink signal or (ii) the uplink data may be rate-matched with the UCI.

Furthermore, at least one parameter among parameters related to the PUR configuration configured based on the PUR configuration information may be updated based on the first PUR update information. At least one of (i) information on whether each of the at least one parameter is updated, (ii) information on whether to some or all of the at least one parameter or (iii) information on whether a specific parameter group which is grouped among the at least one or more parameter may be included in the indication information.

FIG. 33 is a flowchart illustrating an example of an operation embodied in a base station, for performing, by the base station, a method of receiving an uplink signal through a preconfigured uplink resource in a wireless communication system, which is proposed in the present disclosure.

More specifically, in a method of receiving, by a base station, an uplink signal through a preconfigured uplink resource (PUR) in a wireless communication system, the base station transmits, to a UE in a radio resource control (RRC) connected state, PUR configuration information for uplink signal transmission based on the PUR (S3310).

Thereafter, the base station transmits, to the UE that has transited from the RRC connected state to an RRC idle state, first downlink control information (DCI) including first PUR update information for updating a PUR configuration on a first resource of the PUR (S3320).

Finally, the base station receives, from the UE, a first uplink signal transmitted based on whether the first DCI is received by the UE on a second resource of the PUR (S3330).

In this case, based on that the user equipment succeeds in receiving the first DCI, the first uplink signal is transmitted by applying the PUR configuration based on the first PUR update information regardless of whether data for uplink transmission on the second resource is present.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

In the aforementioned embodiments, the elements and characteristics of the present disclosure have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiments of the present disclosure may be implemented by various means, for example, hardware, firmware, software, or a combination thereof. In a hardware implementation, an embodiment of the present disclosure may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

The method for uplink transmission through a preconfigured resource in a wireless communication system of the present disclosure has been described based on an example in which the method is applied to the 3GPP LTE/NR systems, but may also be applied to various wireless communication systems in addition to the 3GPP LTE/NR systems.

The invention claimed is:

1. A method by a user equipment for transmitting an uplink signal through a preconfigured uplink resource (PUR) in a wireless communication system, the method comprising:
    receiving, from a base station, PUR configuration information for uplink signal transmission based on the PUR, in a radio resource control (RRC) connected state;
    transitioning from the RRC connected state to an RRC idle state;
    receiving, from the base station, first downlink control information (DCI) including first PUR update information for updating a PUR configuration on a first resource of the PUR; and
    transmitting, to the base station, a first uplink signal on a second resource of the PUR based on whether the first DCI is received by the user equipment,
    wherein based on that the user equipment succeeds in receiving the first DCI, the first uplink signal is transmitted by applying the PUR configuration based on the first PUR update information regardless of whether data for uplink transmission on the second resource is present.

2. The method of claim 1, wherein based on the data for the uplink transmission on the second resource being not generated, the first uplink signal includes dummy data or a same data as specific uplink data transmitted on a resource before the second resource.

3. The method of claim 2, wherein the second resource to which the first uplink signal is transmitted is counted as a skipping event by a PUR skipping counter for releasing the PUR.

4. The method of claim 3, wherein based on a value of the PUR skipping counter reaching a specific threshold for releasing the PUR by the second resource being counted as the skipping event, transmission of the first uplink signal is dropped and the PUR is released.

5. The method of claim 1, wherein based on the data for the uplink transmission on the second resource being generated, the first uplink signal includes the generated data.

6. The method of claim 1, wherein based on that (i) the user equipment fails to receive the first DCI and (ii) the data for the uplink transmission on the second resource is not generated, further comprising:
skipping transmission of the first uplink signal on the second resource.

7. The method of claim 6, further comprising:
receiving, from the base station, indication information indicating to perform monitoring for reception of second PUR update information after skipping transmission of the first uplink signal even when the data for the uplink transmission on the second resource is not generated,
wherein the indication information is included in at least one of the PUR configuration information and the first DCI.

8. The method of claim 7, wherein the monitoring is performed in at least one of PUR search space (SS) or machine type communication physical downlink control channel search space (MPDCCH SS).

9. The method of claim 8, further comprising:
receiving, from the base station, second DCI including the second PUR update information based on skipping of the transmission of the first uplink signal on the second resource.

10. The method of claim 1, wherein based on that (i) the user equipment fails to receive the first DCI, and (ii) the data for the uplink transmission on the second resource is generated, the first uplink signal includes the generated data and is transmitted by applying the PUR configuration based on the first PUR configuration information.

11. The method of claim 1,
wherein based on the PUR configuration being updated, a specific offset value for indicating to the base station whether the PUR configuration is updated is applied to values of some parameters which are semi-statically configured, among parameters related to the PUR configuration,
wherein the first uplink signal is transmitted based on the values of the some parameters to which the specific offset value is applied, and
wherein the specific offset value is included in the first DCI.

12. The method of claim 11, wherein based on the some parameters are a demodulation reference signal (DM-RS) pattern, the specific offset value is applied to at least one of a DM-RS sequence, a cyclic shift, or an orthogonal cover code (OCC).

13. The method of claim 1,
wherein the first uplink signal includes indication information for whether the PUR configuration is updated, and
wherein based on the data for the uplink transmission on the second resource being not generated, (i) the indication information is included in the first uplink signal by replacing dummy data by a MAC (medium access control) CE (control element) related to the indication information or (ii) the indication information is included in the first uplink signal in a form in which the MAC CE is multiplexed at MAC level with all or part of data same with the specific uplink data transmitted on the resource before the second resource, and
based on the data for the uplink transmission on the second resource being generated, the indication information is included in the first uplink signal in a form in which the MAC CE is multiplexed with the generated data at the MAC level.

14. The method of claim 1,
wherein the first uplink signal includes uplink control information (UCI) including indication information indicating whether the PUR configuration is updated, and
wherein (i) the UCI is punctured with uplink data included in the first uplink signal or (ii) the uplink data is rate-matched with the UCI.

15. The method of claim 14,
wherein at least one parameter among parameters related to the PUR configuration configured based on the PUR configuration information is updated based on the first PUR update information, and
wherein at least one of (i) information on whether each of the at least one parameter is updated, (ii) information on whether to some or all of the at least one parameter, or (iii) information on whether a specific parameter group which is grouped among the at least one or more parameter is included in the indication information.

16. A user equipment for transmitting an uplink signal through a preconfigured uplink resource (PUR) in a wireless communication system, the user equipment comprising:
a transmitter for transmitting a radio signal;
a receiver for receiving the radio signal; and
a processor operatively coupled to the transmitter and the receiver,
wherein the processor is configured to control:
the receiver to receive, from a base station, PUR configuration information for uplink signal transmission based on the PUR, in a radio resource control (RRC) connected state;
to transit from the RRC connected state to an RRC idle state;
the receiver to receive, from the base station, first downlink control information (DCI) including first PUR update information for updating a PUR configuration on a first resource of the PUR; and
the transmitter to transmit, to the base station, a first uplink signal on a second resource of the PUR based on whether the first DCI is received,
wherein based on that the user equipment succeeds in receiving the first DCI, the first uplink signal is transmitted by applying the PUR configuration based on the first PUR update information regardless of whether data for uplink transmission on the second resource is present.

17. An apparatus comprising one or more memories and one or more processors operatively coupled to the one or more memories,
wherein the one or more processors control the apparatus to:
receive, from a base station, PUR configuration information for uplink signal transmission based on the PUR, in a radio resource control (RRC) connected state;
transit from the RRC connected state to an RRC idle state;
receive, from the base station, first downlink control information (DCI) including first PUR update information for updating a PUR configuration on a first resource of the PUR; and
transmit, to the base station, a first uplink signal on a second resource of the PUR based on whether the first DCI is received,
wherein based on that the user equipment succeeds in receiving the first DCI, the first uplink signal is transmitted by applying the PUR configuration based on the first PUR update information regardless of whether data for uplink transmission on the second resource is present.

* * * * *